US012670215B2

(12) United States Patent
Wang et al.

(10) Patent No.: US 12,670,215 B2
(45) Date of Patent: Jun. 30, 2026

(54) METHOD AND DEVICE FOR GENERATING TEMPORAL GRAPH WITH TIME-BOUND COMMUNITIES

(71) Applicant: Tsinghua University, Beijing (CN)

(72) Inventors: Chaokun Wang, Beijing (CN); Shuwen Zheng, Beijing (CN); Cheng Wu, Beijing (CN); Hao Feng, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 19/090,386

(22) Filed: Mar. 25, 2025

(65) Prior Publication Data

US 2025/0335507 A1 Oct. 30, 2025

Related U.S. Application Data

(63) Continuation of application No. PCT/CN2024/097793, filed on Jun. 6, 2024.

(30) Foreign Application Priority Data

Apr. 30, 2024 (CN) .......................... 202410544086.8

(51) Int. Cl.
*G06F 16/901* (2019.01)
(52) U.S. Cl.
CPC ...... *G06F 16/9024* (2019.01); *G06F 16/9027* (2019.01)
(58) Field of Classification Search
CPC ............. G06F 16/9024; G06F 16/9027; G06F 16/906; G06F 16/2255; G06N 3/049; G06N 5/04; G06N 3/047; G06N 3/063

(Continued)

(56) References Cited

U.S. PATENT DOCUMENTS 11,195,107 B1 12/2021 Jiang et al.
2014/0149583 A1* 5/2014 Gil .......................... G06Q 10/40
709/224

(Continued)

FOREIGN PATENT DOCUMENTS

CN 113035366 A 6/2021
CN 113424180 A 9/2021

(Continued)

OTHER PUBLICATIONS

Zheng et al., Generation Algorithm of Temporal Networks with Anchor Communities, dated Oct. 20, 2023.

*Primary Examiner* — Md I Uddin
(74) *Attorney, Agent, or Firm* — Zhong Law, LLC

(57) ABSTRACT

The present disclosure relates to at least: grouping a set of nodes in a target scenario to obtain nodes included in each of a plurality of time-bound communities; the numbers of nodes in the communities follow a power-law distribution; generating a time window for each of the plurality of time-bound communities, wherein starting times of time windows corresponding to the plurality of time-bound communities follow a uniform distribution, and lengths of the time windows corresponding to the plurality of time-bound communities follow a power-law distribution; and constructing an index structure that is transferable between different time-bound communities, and generating temporal edges within each time-bound community and/or temporal edges between different time-bound communities of the plurality of time-bound communities based on the nodes included in the respective time-bound communities, the time windows of the respective time-bound communities, and the index structure, thus generating a temporal graph for a target scenario.

9 Claims, 18 Drawing Sheets

(58) Field of Classification Search
USPC ....... 707/661, 738, 746, 769, 798, 822, 827,
707/999.01, 999.104; 706/12, 21, 20
See application file for complete search history.

(56) References Cited

U.S. PATENT DOCUMENTS

| | | | | |
|---|---|---|---|---|
| 2017/0039305 A1* | 2/2017 | Shakarian | ............... | G06F 30/20 |
| 2017/0270210 A1* | 9/2017 | Padmanabhan | ..... | G06F 16/9024 |
| 2019/0295114 A1* | 9/2019 | Pavletic | ................. | G06Q 30/02 |
| 2020/0233844 A1* | 7/2020 | Kessel | .................. | G06F 16/906 |

FOREIGN PATENT DOCUMENTS

| | | |
|---|---|---|
| CN | 117149843 A | 12/2023 |
| CN | 117493700 A | 2/2024 |

* cited by examiner

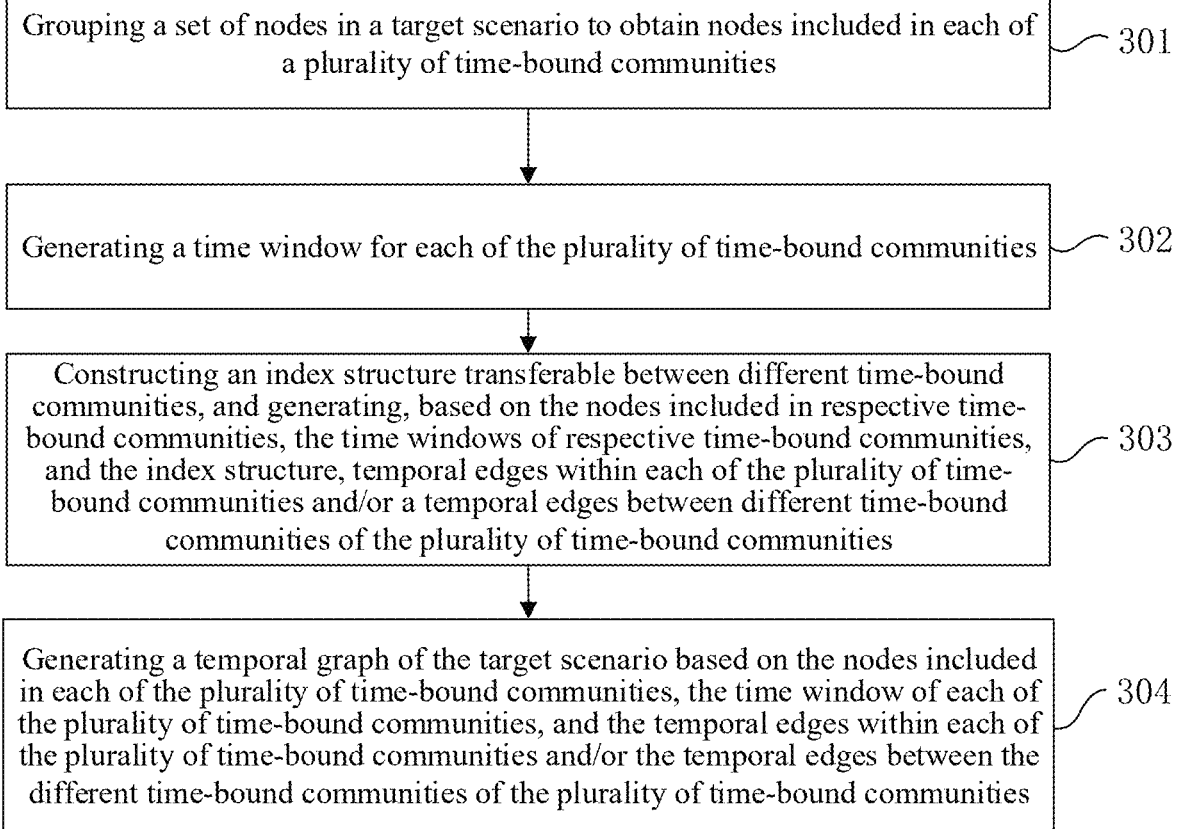

Grouping a set of nodes in a target scenario to obtain nodes included in each of a plurality of time-bound communities ⟋ 301

Generating a time window for each of the plurality of time-bound communities ⟋ 302

Constructing an index structure transferable between different time-bound communities, and generating, based on the nodes included in respective time-bound communities, the time windows of respective time-bound communities, and the index structure, temporal edges within each of the plurality of time-bound communities and/or a temporal edges between different time-bound communities of the plurality of time-bound communities ⟋ 303

Generating a temporal graph of the target scenario based on the nodes included in each of the plurality of time-bound communities, the time window of each of the plurality of time-bound communities, and the temporal edges within each of the plurality of time-bound communities and/or the temporal edges between the different time-bound communities of the plurality of time-bound communities ⟋ 304

FIG. 3

(a) Distribution of starting times of time windows (b) Distribution of lengths of time windows

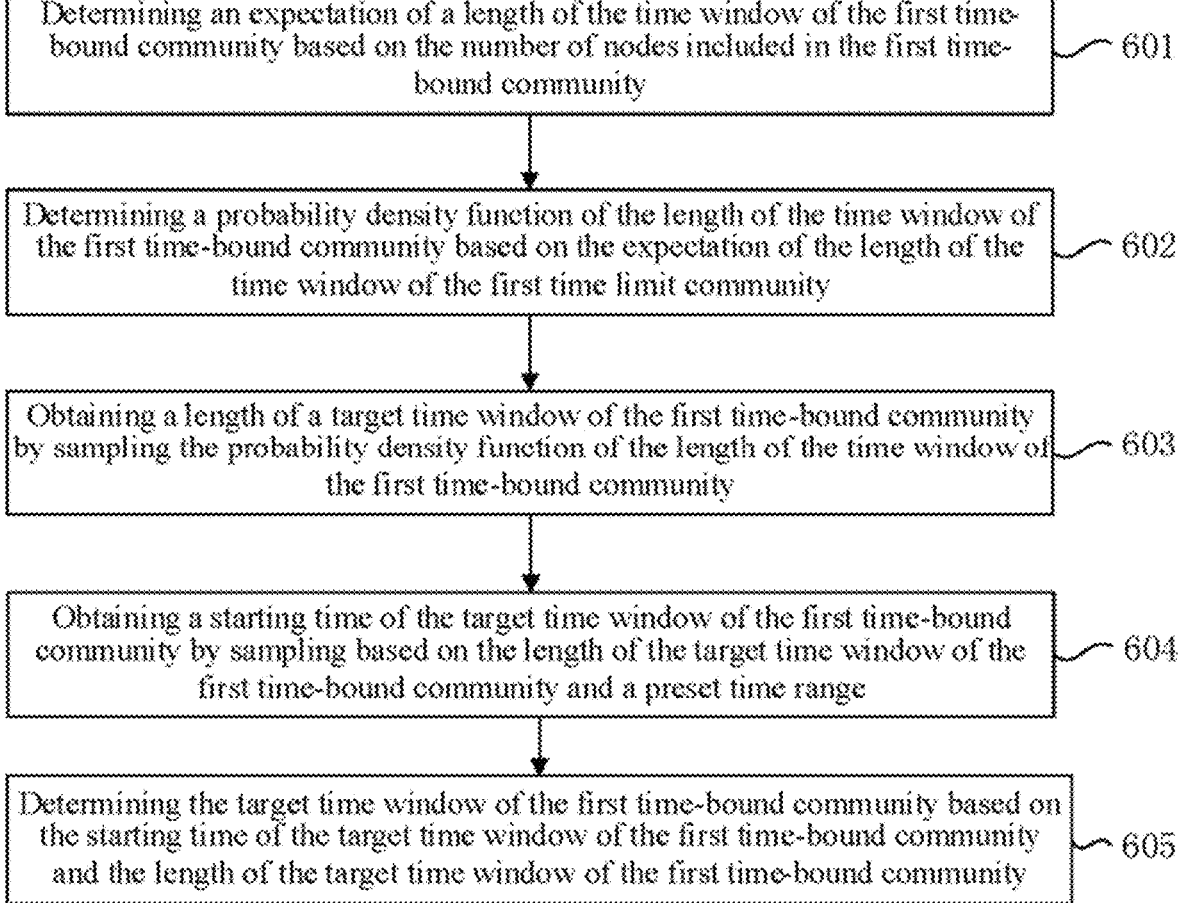

Determining an expectation of a length of the time window of the first time-bound community based on the number of nodes included in the first time-bound community ⟞ 601

Determining a probability density function of the length of the time window of the first time-bound community based on the expectation of the length of the time window of the first time limit community ⟞ 602

Obtaining a length of a target time window of the first time-bound community by sampling the probability density function of the length of the time window of the first time-bound community ⟞ 603

Obtaining a starting time of the target time window of the first time-bound community by sampling based on the length of the target time window of the first time-bound community and a preset time range ⟞ 604

Determining the target time window of the first time-bound community based on the starting time of the target time window of the first time-bound community and the length of the target time window of the first time-bound community ⟞ 605

FIG. 6

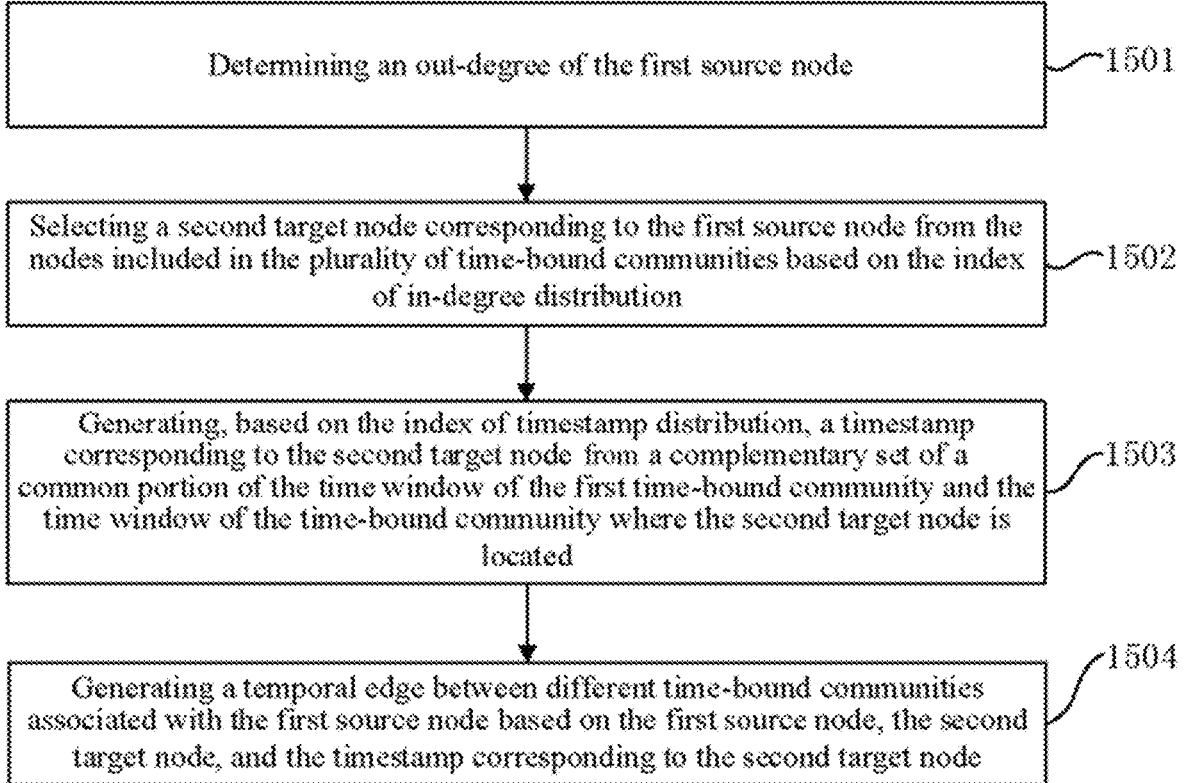

Determining an out-degree of the first source node                                    ~1501

Selecting a second target node corresponding to the first source node from the
nodes included in the plurality of time-bound communities based on the index           ~1502
of in-degree distribution Generating, based on the index of timestamp distribution, a timestamp
corresponding to the second target node from a complementary set of a
common portion of the time window of the first time-bound community and the            ~1503
time window of the time-bound community where the second target node is
located Generating a temporal edge between different time-bound communities                    1504
associated with the first source node based on the first source node, the second
target node, and the timestamp corresponding to the second target node

FIG. 15

METHOD AND DEVICE FOR GENERATING TEMPORAL GRAPH WITH TIME-BOUND COMMUNITIES

CROSS-REFERENCE TO RELATED APPLICATIONS

This application is a continuation of Patent Cooperation Treaty Application No. PCT/CN2024/097793, filed Jun. 6, 2024, which claims priority to Chinese Patent Application No. 202410544086.8, filed Apr. 30, 2024, the entire contents of which are incorporated herein by reference.

TECHNICAL FIELD

The present disclosure relates to the technical field of network information, in particular to a method and a device for generating a temporal graph with time-bound communities.

BACKGROUND

With the rapid development of graph data management technology, graph data synthesis methods have attracted increasing attention. In view of the fact that in real-world network graph data is often difficult to obtain due to reasons such as privacy protection and high costs, and the fact that tasks such as community detection, community search, and social recommendation require a large amount of graph data to assess the effectiveness and efficiency of related algorithms, a rapid generation of graph data that meets user's requirements has become a fundamental issue of research in promoting the development in the field of large-scale graph data management and analysis.

Many research achievements have been made in the field of graph generation. A series of static graph generation algorithms have been proposed to date. On this basis, an increasing number of social network graph generation algorithms have emerged to generate community structures in graphs. However, the above static graph generation algorithms do not take into account the temporal evolution characteristics of graphs. To address this issue, a series of temporal graph generation algorithms have been proposed in succession, in which each edge is marked with a timestamp that is the precise time instant when an interaction between nodes occurs. Furthermore, some methods take into account both temporal dynamics and community structures in graphs, to generate temporal social network graph data. However, the vast majority of existing graph generation methods focus solely on the formation process of a community but do not reflect the extinction process of a community.

SUMMARY

In view of the above, the present disclosure provides a method and a device for generating a temporal graph with time-bound communities, an electronic apparatus, and a storage medium.

According to one aspect of the present disclosure, there is provided a method for generating a temporal graph with time-bound communities, the method comprising:

grouping a set of nodes in a target scenario to obtain nodes included in each of a plurality of time-bound communities, wherein the time-bound community represents a community that is in active status for a period of time and eventually goes extinct; and the numbers of nodes included in the plurality of time-bound communities follow a power-law distribution;

generating a time window for each of the plurality of time-bound communities, wherein starting times of the time windows corresponding to the plurality of time-bound communities follow a uniform distribution, and lengths of the time windows corresponding to the plurality of time-bound communities follow a power-law distribution;

constructing an index structure that is transferable between different time-bound communities, and generating, based on the nodes included in respective time-bound communities, the time windows of respective time-bound communities, and the index structure, temporal edges within each time-bound community of the plurality of time-bound communities and/or temporal edges between different time-bound communities of the plurality of time-bound communities; and generating, based on the nodes included in each of the plurality of time-bound communities, the time window of each of the plurality of time-bound communities, and the temporal edges within each time-bound community of the plurality of time-bound communities and/or the temporal edges between different time-bound communities of the plurality of time-bound communities, a temporal graph of the target scenario.

According to another aspect of the present disclosure, the present disclosure may be used in the financial field, in particular for producing a financial transfer network including a group of abnormal activities, which then may serve in experimental tests on abnormal transfer detecting algorithms in the financial field. A method may comprise:

determining members active in a specific scenario;

determining a time interval for which each member is active in the specific scenario;

determining specific interactions (edges) including member interactions within a community and member interactions across communities; and determining a whole temporal graph containing a plurality of financial activities based on the determined active member nodes, the determined active time intervals, and the determined interaction edges, wherein each financial activity corresponds to one time-bound community.

According to another aspect of the present disclosure, the present disclosure may be used in the field of socializing, in particular for producing a community Q&A website containing discussion communities, which then may serve in experimental tests on algorithms for community detection on community Q&A website, facilitating group recommendation and network monitoring. A method may comprise:

determining members of each of a plurality of discussion groups;

determining a time interval for which each discussion group lasts;

determining interactions for each discussion group, including member interactions within a discussion group and member interactions across discussion groups; and determining a whole temporal graph containing a plurality of discussion groups based on the determined member nodes of each discussion group, the determined time intervals of the discussion groups, and the determined member interactions, wherein each discussion group corresponds to one time-bound community.

According to another aspect of the present disclosure, the present disclosure may be used in the biology field, in particular for producing a temporal protein-protein interaction network containing dynamic protein complexes, which then may serve in experimental tests on dynamic protein complex detection algorithms. A method may comprise:

determining protein molecules constituting each of a plurality of protein complexes;

determining a time interval for which each protein complex functions;

determining a specific form of link within each protein complex; and determining a whole dynamic protein-protein interaction network graph containing the plurality of protein complexes based on the determined protein molecules constituting each protein complex, the determined functioning time intervals, and the determined forms of link, wherein each protein complex corresponds to one time-bound community.

In one possible implementation, constructing the index structure transferable between different time-bound communities comprises:

selecting a time-bound community containing a largest number of nodes from the plurality of time-bound communities, and establishing an index of out-degree distribution and an index of in-degree distribution for the time-bound community containing the largest number of nodes; and selecting a time-bound community with a longest time window from the plurality of time-bound communities, and establishing an index of timestamp distribution for the time-bound community with the longest time window.

In one possible implementation, generating, based on the nodes included in the respective time-bound communities, the time windows of the respective time-bound communities, and the index structure, the temporal edges within each of the plurality of time-bound communities and/or the temporal edges between different time-bound communities of the plurality of time-bound communities comprises:

generating a tree structure with respect to nodes included in a first time-bound community, wherein the first time-bound community is any of the plurality of time-bound communities;

determining an out-degree of a first source node based on the index of out-degree distribution, wherein the first source node is any source node in the tree structure;

selecting a first target node corresponding to the first source node from the nodes included in the first time-bound community based on the index of in-degree distribution, wherein the number of the first target nodes is the same as the out-degree of the first source node;

generating, based on the index of timestamp distribution, a timestamp corresponding to the first target node from a time window of the first time-bound community; and generating a temporal edge within the first time-bound community associated with the first source node based on the first source node, the first target node, and the timestamp corresponding to the first target node.

In one possible implementation, generating, based on the nodes included in the respective time-bound communities, the time windows of the respective time-bound communities, and the index structure, the temporal edges within each of the plurality of time-bound communities and/or the temporal edges between the different time-bound communities of the plurality of time-bound communities further comprises:

determining a between-out-degree of the first source node, wherein the between-out-degree represents the number of edges associated with the node that do not belong to any of the time-bound communities;

selecting a second target node corresponding to the first source node from the nodes included in the plurality of time-bound communities based on the index of in-degree distribution, wherein the number of the second target nodes is the same as the between-out-degree of the first source node, and the first source node and the second target node belong to different time-bound communities;

generating, based on the index of timestamp distribution, a timestamp corresponding to the second target node from a complementary set of a common portion of a time window of a time-bound community where the first source node is located and a time window of a time-bound community where the second target node is located; and generating a temporal edge between different time-bound communities associated with the first source node based on the first source node, the second target node, and timestamp corresponding to the second target node.

In one possible implementation, the number of temporal edges between different time-bound communities of the plurality of time-bound communities is determined by a preset messing parameter, wherein the messing parameter represents a degree of clarity of the boundary between the different time-bound communities.

In one possible implementation, generating the time window for each of the plurality of time-bound communities comprises:

determining an expectation of a length of the time window of the first time-bound community based on the number of nodes included in the first time-bound community;

determining a probability density function of the length of the time window of the first time-bound community based on the expectation of the length of the time window of the first time-bound community;

obtaining a length of a target time window of the first time-bound community by sampling the probability density function of the length of the time window of the first time-bound community;

obtaining a starting time of the target time window of the first time-bound community by sampling based on the length of the target time window of the first time-bound community and a preset time range; and determining the target time window of the first time-bound community based on the starting time of the target time window of the first time-bound community and the length of the target time window of the first time-bound community.

In one possible implementation, determining the expectation of the length of the time window of the first time-bound community based on the number of nodes included in the first time-bound community comprises:

calculating an average value of the length of the time window of the first time-bound community based on the number of nodes included in the first time-bound community, wherein a logarithmic correlation exists between the average value of the length of the time window of the first time-bound community and the number of nodes included in the first time-bound community; and determining the average value of the length of the time window of the first time-bound community as the expectation of the length of the time window of the first time-bound community.

In one possible implementation, the plurality of time-bound communities comprise a preset number of overlapping structures, wherein each of the overlapping structures comprises a shared node present in two time-bound communities; and a degree of the shared node exceeds degrees of other nodes in either of the two time-bound communities, and a ratio of the number of shared nodes to the number of nodes in either of the two time-bound communities is a preset value.

According to another aspect of the present disclosure, there is provided a device for generating a temporal graph with time-bound communities, comprising:

a node grouping module configured to group a set of nodes in a target scenario to obtain nodes included in each of a plurality of time-bound communities, wherein the time-bound community represents a community that is in active status for a period of time and eventually goes extinct; and numbers of nodes included in the plurality of time-bound communities follow a power-law distribution;

a time window binding module configured to generate a time window for each of the plurality of time-bound communities, wherein starting times of the time windows corresponding to the plurality of time-bound communities follow a uniform distribution, and lengths of the time windows corresponding to the plurality of time-bound communities follow a power-law distribution;

a temporal edge linking module configured to construct an index structure that is transferable between different time-bound communities, and generate, based on the nodes included in respective time-bound communities, the time windows of respective time-bound communities, and the index structure, temporal edges within each of the plurality of time-bound communities and/or temporal edges between different time-bound communities of the plurality of time-bound communities; and a generation module configured to generate, based on the nodes included in each of the plurality of time-bound communities, the time window of each of the plurality of time-bound communities, and the temporal edges within each of the plurality of time-bound communities and/or the temporal edges between different time-bound communities of the plurality of time-bound communities, a temporal graph of the target scenario.

According to another aspect of the present disclosure, there is provided an electronic apparatus, comprising: a processor; and a memory for storing processor executable instructions, wherein the processor is configured to, when executing the instructions stored in the memory, implement the method described above.

According to another aspect of the present disclosure, there is provided a non-transitory computer readable storage medium having computer program instructions stored thereon, wherein the computer program instructions, when executed by a processor, implement the method described above.

According to another aspect of the present disclosure, there is provided a computer program product comprising computer readable code, or a non-transitory computer readable storage medium carrying computer readable code, wherein when the computer readable code is run in a processor of an electronic apparatus, the processor of the electronic apparatus implements the method described above.

According to an embodiment of the present disclosure, a set of nodes in a target scenario is grouped to obtain nodes included in each of a plurality of time-bound communities; the numbers of nodes included in the plurality of time-bound communities follow a power-law distribution; a time window is generated for each of the plurality of time-bound communities, wherein starting times of the time windows corresponding to the plurality of time-bound communities follow a uniform distribution, and lengths of the time windows corresponding to the plurality of time-bound communities follow a power-law distribution; an index structure that is transferable between different time-bound communities is constructed, and temporal edges within each of the plurality of time-bound communities and/or temporal edges between different time-bound communities of the plurality of time-bound communities are generated based on the nodes included in the respective time-bound communities, the time windows of the respective time-bound communities, and the index structure; and a temporal graph of the target scenario is generated based on the nodes included in each of the plurality of time-bound communities, the time window of each of the plurality of time-bound communities, and the temporal edges within each of the plurality of time-bound communities and/or the temporal edges between different time-bound communities of the plurality of time-bound communities. Thus, through the three phases of node grouping, time window binding, and temporal edge linking, a temporal graph with time-bound communities is generated, wherein the number of nodes included in the time-bound communities, the starting times of the time windows of the time-bound communities, the lengths of the time windows of the time-bound communities, and the like all follow specific distributions, which may reflect the real situation of network distribution. By way of example, a user may specify parameters for a specific distribution. It is also possible to quickly generate temporal edges based on the index structure transferable between different time-bound communities, thereby generating a temporal graph that contains time-bound communities and meets the user requirements in a flexible and efficient manner.

In one possible implementation, the index of out-degree distribution and the index of in-degree distribution established for the time-bound community containing the largest number of nodes can be transferred to and used for other time-bound communities with fewer nodes; and the index of timestamp distribution established for the time-bound community with the longest time window can be transferred to and used for other time-bound communities with shorter time windows. By the transfer of the indexes, temporal edges within and between the time-bound communities under the constraints of specific distributions can be generated with less time and/or memory space.

Other features and aspects of the present disclosure will become apparent from the following detailed description of exemplary embodiments with reference to the drawings.

BRIEF DESCRIPTION OF THE DRAWINGS

The drawings, which are incorporated in and constitute a part of the description, together with the description, illustrate exemplary embodiments, features, and aspects of the present disclosure, and serve to explain the principle of the present disclosure.

FIG. 3 shows a flowchart of a method for generating a temporal graph with time-bound communities according to an embodiment of the present disclosure.

FIG. 6 shows a flowchart of generating a time window for each of a plurality of time-bound communities according to an embodiment of the present disclosure.

FIG. 15 shows a flowchart of a method for generating a temporal edge between different time-bound communities according to an embodiment of the present disclosure.

DETAILED DESCRIPTION

Figure 1:
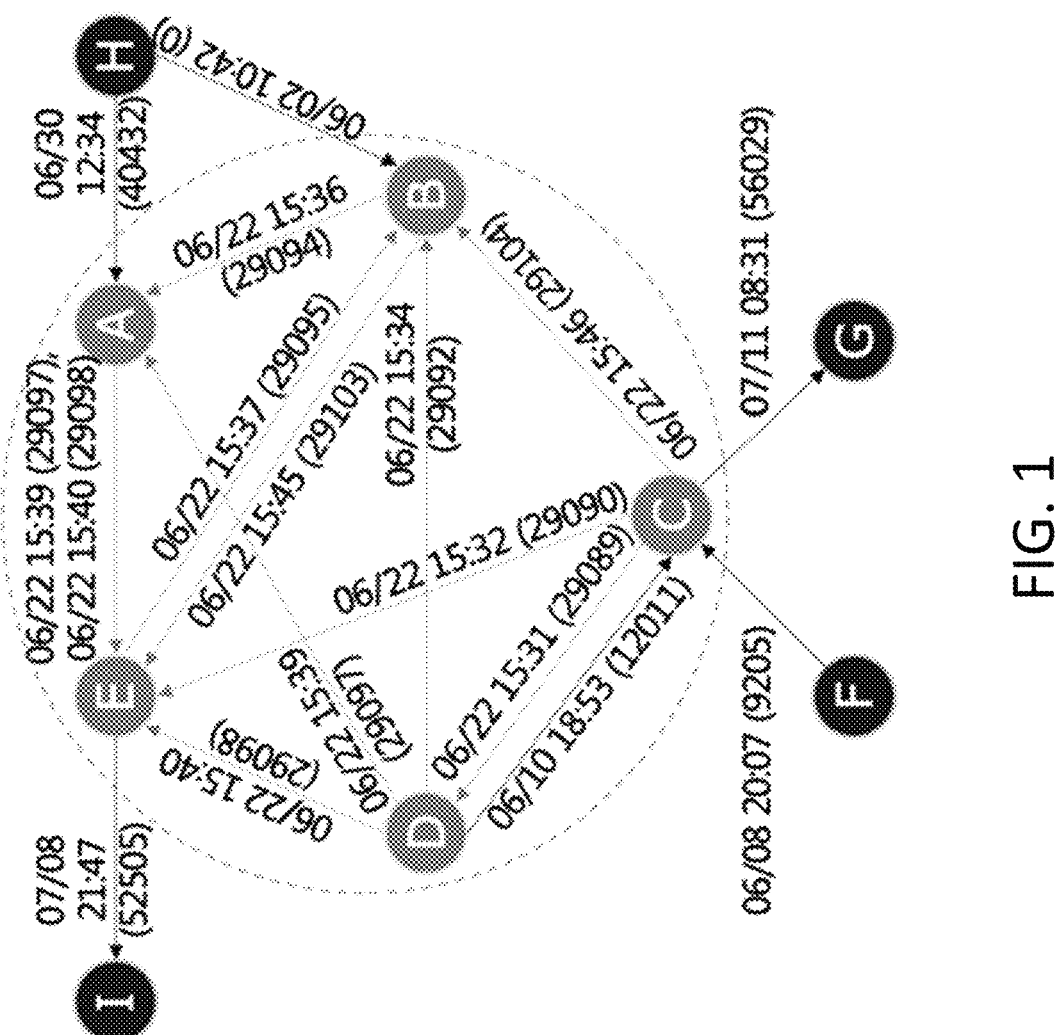
FIG. 1 shows a schematic diagram of an online financial transfer network according to an embodiment of the present disclosure.

Various exemplary embodiments, features and aspects of the present disclosure will be explained in detail below with reference to the drawings. In the drawings, the same reference signs denote elements with the same or similar functions. Although various aspects of the embodiments are shown in the drawings, unless otherwise specified, the drawings are not necessarily drawn to scale.

References to "an embodiment" or "some embodiments" and the like described in this description mean that one or more embodiments of the present disclosure include specific features, structures, or characteristics described in conjunction with the embodiment or embodiments. Accordingly, the phrases such as "exemplary", "in one embodiment", "in some embodiments", "in some further embodiments", and "in some other embodiments", which appear in different parts of this specification, do not necessarily refer to the same embodiment or embodiments, but rather mean "one or more but not all of the embodiments", unless otherwise specifically emphasized. The words "include", "comprise", "have" or any other variant thereof, as used herein, mean "including but not limited to", unless otherwise specifically emphasized.

In the present disclosure, "at least one" means one or more, and "a plurality of" means two or more. The term "and/or" describes an association relationship between the associated objects, which represents that there may be three relationships, for example, A and/or B may represent cases of: A existing alone, A and B existing simultaneously, and B existing alone, wherein A and B may be singular or plural. The character "/" generally indicates an "OR" relationship between the associated objects before and after. The phrase "at least one of the following items" or a similar phrase refers to any combination of the items, including a single item or any combination of multiple items. For example, at least one of a, b, or c may represent: a, b, c, a-b, a-c, b-c, or a-b-c, wherein a, b, and c may be single or multiple.

In addition, to better explain the present disclosure, numerous details are given in the following embodiments. It should be appreciated by those skilled in the art that the present disclosure can still be implemented without some specific details. In some embodiments, methods, means, elements and circuits well known to those skilled in the art are not described in detail in order to highlight the gist of the present disclosure.

As a living entity, a community in real world goes through not only the process of formation but also the process of extinction. A community may represent a unit composed of several objects participating in a same activity. For examples:

Scenario I: In a scenario of online financial transfer, relevant individuals may engage in abnormal transfer behaviors, such as frequent transfers to each other for a very short period of time. FIG. 1 shows a schematic diagram of an online financial transfer network according to an embodiment of the present disclosure. As shown in FIG. 1, nodes A, B, C . . . represent accounts, and inter-account transfers taking place at specific times are represented as temporal edges, wherein a timestamp represents the actual time when each temporal edge occurs, and the timestamp is in unit of minute. For example, the temporal edge between the account denoted by the node B and the account denoted by the node A in the figure indicates that the account denoted by the node B makes a transfer to the account denoted by the node A at 15:36 on June 22. In the financial transfer network shown in FIG. 1 there is a group of abnormal transfers. Specifically, the group of accounts labeled {A, B, C, D, E} (i.e., the purple nodes in FIG. 1) engaged in frequent transfers among users from 15:31 to 15:46 on June 22; the group was active for only 15 minutes; and potential abnormal transfer activities may exist. The transfer activities of the group {A, B, C, D, E} are restricted to a specific time interval.

Figure 2:
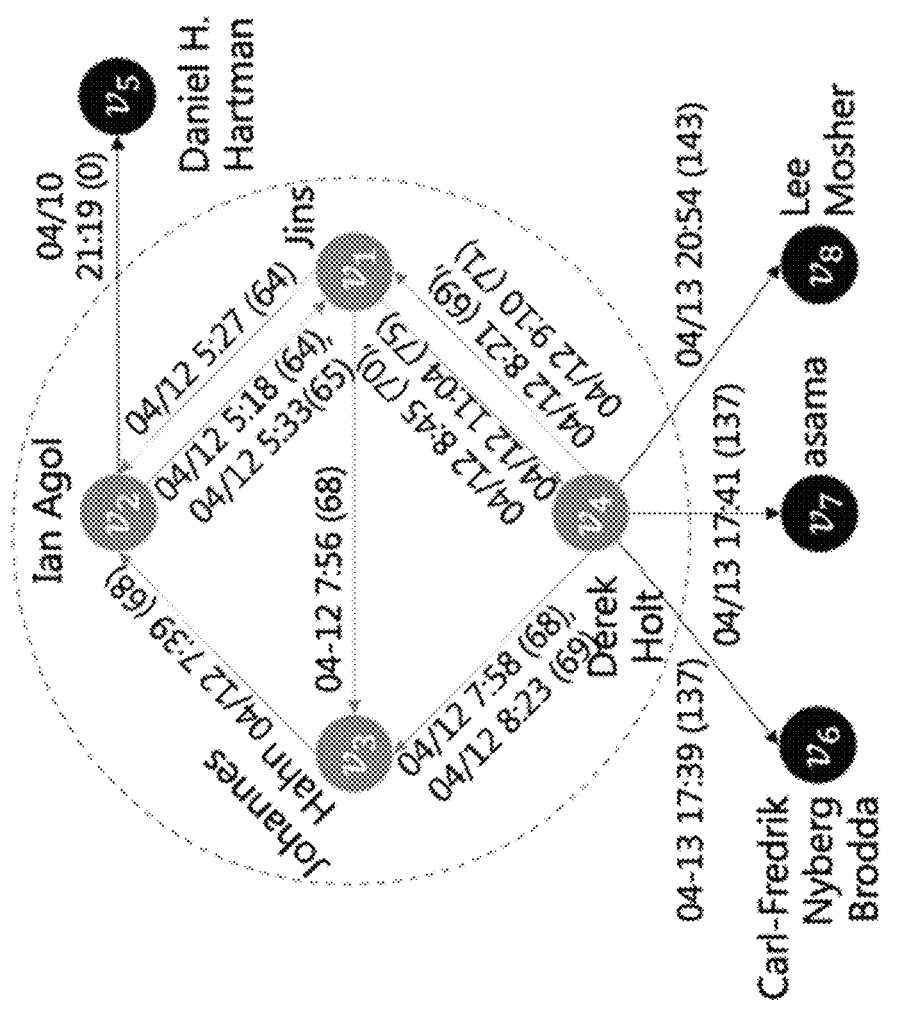
FIG. 2 shows a schematic diagram of a real discussion network according to an embodiment of the present disclosure.

Scenario II: In a scenario of online discussion, participants engage in frequent discussions for a limited period of time. FIG. 2 shows a schematic diagram of a real discussion network according to an embodiment of the present disclosure. As shown in FIG. 2, a small real discussion network in 2022 is extracted from the website "Math Overflow", with nodes $v_1, v_2, \ldots$ representing participants in the discussion (for example, $v_1$ represents Jins, $v_2$ represents Ian Agol, $v_3$ represents Johannes Hahn, and $v_4$ represents Derek Holt). Discussions between participants at specific times are represented as temporal edges, wherein a timestamp represents the actual time when each temporal edge occurs, and the timestamp is in unit of half hour. The discussion group labeled $(v_1,v_2,v_3,v_4)$ is composed of four people, i.e., Jins, Ian Agol, Johannes Hahn, and Derek Holt, and the discussions are about a specific mathematical topic, starting at 5:18 on Apr. 12, 2022 and ending at 11:04 that day. The discussion group lasted only for a limited period of time, and the discussion activities among the members of the discussion group are restricted to a specific time interval.

In the field of graph data management, "node" and "community" are two important concepts. A node refers to an entity, which may be a person, a location, an object, or any other type of entity. A community refers to a subgraph formed by a group of nodes in a graph closely linked to one another, wherein these nodes are more frequently linked to each other than to other nodes. In each of the networks shown in FIG. 1 and FIG. 2, there exists a community that undergoes a formation process and an extinction process, and the activities of the members in this community are restricted to a specific time interval. The embodiment of the present disclosure provides a definition of time-bound community to describe such a community that is active for a specific time interval before it eventually goes extinct. For example, the group {A, B, C, D, E} in FIG. 1 is a time-bound community, and the discussion group $(v_1,v_2,v_3,v_4)$ in FIG. 2 is also a time-bound community. The above scenarios I and II respectively demonstrate that there are communities whose activities are restricted to specific time intervals, that is, there are time-bound communities, in both the financial transfer network and the community Q&A website. In addition to the above scenarios I and II, other scenarios where a time-bound community exists include a temporal protein-protein interaction network, and so on. The discovery of time-bound community facilitates practical applications such as searching for groups conducting abnormal transfers over the financial transfer networks, performing a community detection on a community Q&A website for group recommendation and network monitoring, and performing a dynamic protein complex detection over a temporal protein-protein interaction network.

However, existing temporal graph generation methods have insufficient capabilities in depicting time-bound communities; now most temporal graph generation algorithms either completely neglect the community extinction and focus only on the formation process of community, or simply model the extinction by using the probability of a member node leaving the community in each snapshot. Meanwhile, existing temporal graph generation methods have insufficient capabilities in configuring user-specified distributions; and some temporal graph generation algorithms cannot be adapted to user-specified distributions, while real-world networks may exhibit various types of distributions, such as different timestamp distributions resulting from varying formation and decay rates of networks. Furthermore, existing temporal graph generation methods are inefficient in generating graphs containing time-bound communities. Typically operations are made per snapshot, and the generation of each community is taken as an independent task, resulting in low efficiency in configurations with large time spans or scales.

To address the above technical problems, by analyzing the characteristics of collected real data (e.g., analyzing a data set of temporal graphs containing time-bound communities collected from the website "Math Overflow"), an embodiment of the present disclosure provides a method for generating a temporal graph with time-bound communities. The method comprises a node grouping phase, a time window binding phase, and a temporal edge linking phase; through the three phases a temporal graph with time-bound communities is generated. Numbers of nodes included in the time-bound communities, starting times of time windows of the time-bound communities, the lengths of time windows of the time-bound communities, and the likes all follow specific distributions, which may reflect the real situations of network distribution. By way of example, a user may specify parameters of specific distributions. Temporal edges can be generated quickly based on an index structure transferable between different time-bound communities, thereby generating a temporal graph that contains time-bound communities and meets the user requirements in a flexible and efficient manner.

For example, the method for generating a temporal graph with time-bound communities provided by the embodiments of the present disclosure may be executed by an electronic apparatus or functional modules within an electronic apparatus, wherein the functional modules may be either hardware entities or software modules, which is not limited herein. The electronic apparatus may be, for example, a terminal or a server, wherein the server may be a standalone physical server, or a server cluster composed of a plurality of physical servers, or a cloud server providing basic cloud computing services such as cloud service, cloud database, cloud computing, cloud function, cloud storage, network service, cloud communication, middleware service, domain name service, security service, and big data and artificial intelligence platform. The terminal may be a smartphone, a tablet computer, a laptop computer, a desktop computer, a smart speaker, a smart watch, a smart voice interaction device, a smart home appliance, a vehicle-mounted terminal, etc.

FIG. 3 shows a flowchart of a method for generating a temporal graph with time-bound communities according to an embodiment of the present disclosure. As shown in FIG. 3, the method comprises the following steps:

Step 301: Grouping a set of nodes in a target scenario to obtain nodes included in each of a plurality of time-bound communities.

The step 301 may also be referred to as a node grouping phase. In this phase, the set of nodes is divided into different groups, wherein each group corresponds to a time-bound community, and the nodes in that group are the nodes included in that time-bound community, so that the nodes included in each time-bound community may be determined.

The time-bound community refers to a community that is in active status for a period of time and eventually goes extinct. Being in active status indicates that there are interactive activities among the nodes within the time-bound community, and going extinct indicates that the nodes within the time-bound community no longer have interactive activities or have no interactive activity for a period of time.

By way of example, the target scenario may be the above online financial transfer, community Q&A website, temporal protein-protein interaction, etc. The nodes in the target scenario are the specific active objects in a user-specified scenario, and the time-bound community is the community in the target scenario that is active for a specific time interval before it eventually goes extinct. For example, if the target scenario is an online financial transfer, the nodes in the target scenario are the accounts among which the transfers take place, and a time-bound community may be the group {A, B, C, D, E} in FIG. 1 as mentioned above. For another example, if the target scenario is an online discussion, the nodes in the target scenario are the participants in the discussion, and a time-bound community may be the discussion group $(v_1, v_2, v_3, v_4)$ in FIG. 2 as mentioned above.

For example, the target scenario, the number of nodes $n_v$ included in the set of nodes, and the number of time-bound communities $n_c$ may all be specified by the user as required.

The numbers of nodes included in the plurality of time-bound communities follow a power-law distribution. The number of nodes included in a time-bound community may indicate the size of the time-bound community. Analysis based on real data indicates that in a complex network containing a plurality of communities, the sizes of the communities typically follow a power-law distribution. Accordingly, in this phase, the numbers of nodes included in a plurality of time-bound communities obtained from the grouping of the set of nodes in the target scenario follow a power-law distribution, which may reflect the real situation of network distribution. By way of example, the parameters of the power law distribution may be specified by the user as required; for example, the user may specify the magnitude of the exponent in the power-law distribution.

By way of example, sequentially ordered node numbers in a set of nodes may be divided into $n_c$ segments, wherein each segment represents a set of nodes included in a time-bound community; and the numbers of nodes included in the $n_c$ segments follow a power-law distribution, that is, most segments have a small number of nodes, while a few segments have a large number of nodes.

Step 302: Generating a time window for each of the plurality of time-bound communities.

The step 302 may also be referred to as a time window binding phase, in which an active time window is bound to each time-bound community.

The starting times (which may also be referred to as starting timestamps) of the time windows corresponding to the plurality of time-bound communities follow a uniform distribution, and the lengths of the time windows corresponding to the plurality of time-bound communities follow a power-law distribution.

For any time window, and for any time-bound community, a time window w thereof should meet the requirement that the interactions among nodes within the time-bound community are more frequent within the time window than the interactions among the nodes within the time-bound community outside the time window w, and that within the time window, the interactions among nodes within the time-bound community are more frequent than interactions between the nodes within the time-bound community and other nodes. For example, the time-bound community may be a subgraph composed of the group $\{v_1, v_2, v_3, v_4\}$ in FIG. 2 as mentioned above, and the time window w corresponding to the time-bound community may be [64,71], i.e., an interval with the earliest interaction time and the latest interaction time within the time-bound community serving as the endpoints. The group $\{v_1, v_2, v_3, v_4\}$ interact frequently with each other within the time window [64,71], while the group $\{v_1, v_2, v_3, v_4\}$ do not interact outside the time window [64,71], that is, the interactions among the group $\{v_1, v_2, v_3, v_4\}$ are more frequent within the time window [64,71] than the interactions among the group $\{v_1, v_2, v_3, v_4\}$ outside the time window [64,71]; and in the meantime, the group $\{v_1, v_2, v_3, v_4\}$ do not have interaction with other nodes such as $v_5, v_6, v_7$, and $v_8$ within the time window [64,71], therefore the interactions among the group $\{v_1, v_2, v_3, v_4\}$ within the time window [64,71] are more frequent than the interactions between the group $\{v_1, v_2, v_3, v_4\}$ and other nodes such as $v_5, v_6, v_7$, and $v_8$ within the time window [64,71].

Figure 4:
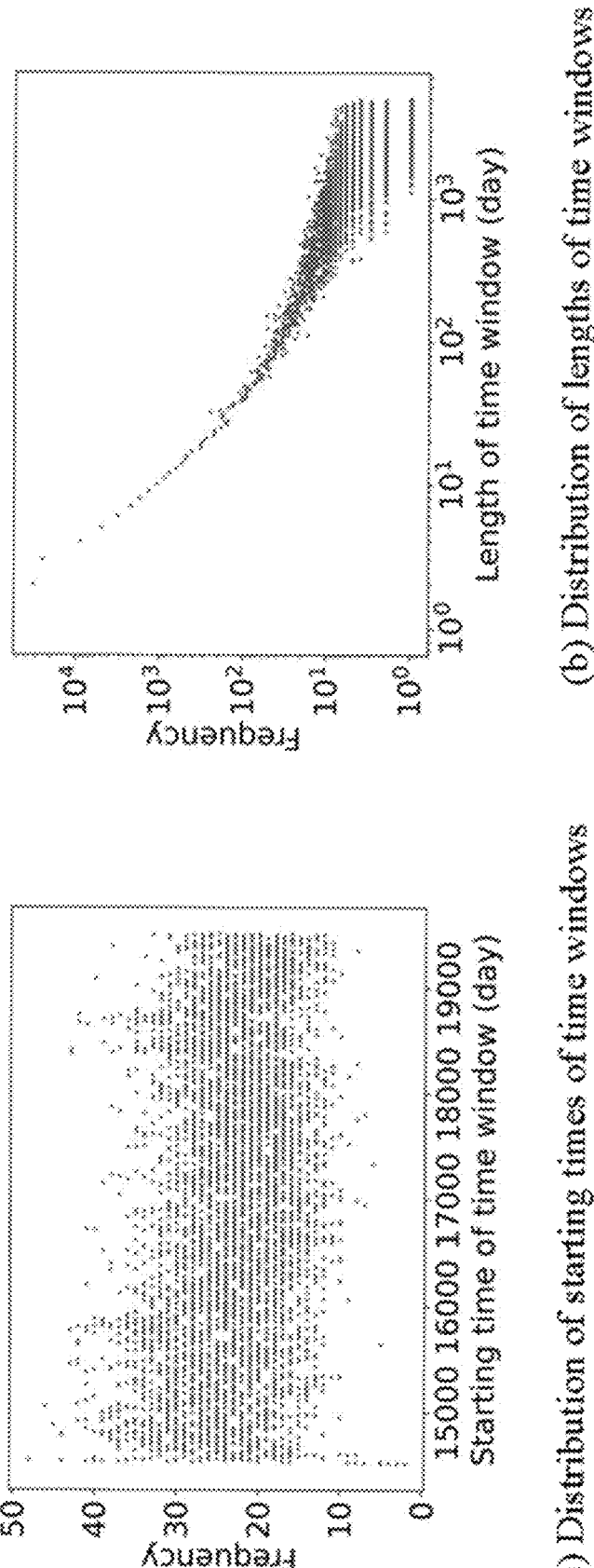
FIG. 4(*a*) and FIG. 4(*b*) show schematic diagrams of time window characteristics in a real discussion network according to an embodiment of the present disclosure.

FIG. 4(a) and FIG. 4(b) show schematic diagrams of time window characteristics in a real discussion network according to an embodiment of the present disclosure. The real discussion network is extracted from the website "Math Overflow". In this real discussion network, the time windows of the time-bound communities have the characteristics as shown in FIG. 4(a) and FIG. 4(b). FIG. 4(a) illustrates a distribution of the starting times of the time windows, indicating a relationship between the starting times of the time windows $t_s$ (in unit of day) and the frequency. It can be found that the starting times of the time windows $t_s$ are almost uniformly distributed, which is in line with the expectation that the users may freely choose when to start the discussions. FIG. 4(b) illustrates a distribution of the lengths of the time windows, indicating a relationship between the lengths of the time windows |w| (in unit of day) and the frequency. It can be found that the lengths of the time windows |w| in this real discussion network shows a tendency of approximately a power-law distribution, which indicates that most of the discussions last long and only a small portion of the discussions last long. Therefore, in this phase, time windows are generated for the respective time-bound communities obtained from the node grouping phase, with the starting times of the generated time windows following a uniform distribution and the lengths of the generated time windows following a power-law distribution, reflecting the real situation of the network distribution.

Step 303: Constructing an index structure that is transferable between different time-bound communities, and generating, based on the nodes included in the respective time-bound communities, the time windows of the respective time-bound communities, and the index structure, temporal edges within each of the plurality of time-bound communities and/or temporal edges between different time-bound communities of the plurality of time-bound communities.

The step 303 may also be referred to as a temporal edge linking phase, in which temporal edges within each time-bound community or between different time-bound communities are generated based on an index structure that is transferable between different time-bound communities, the nodes included in the respective time-bound communities determined in the above node grouping phase, and the time windows generated for the respective time-bound communities in the above time window binding phase.

A temporal edge is a directed edge indicating a direction in which two nodes interact and a time when the interaction occurs. By way of example, a temporal edge consists of a source node, a target node, and a timestamp, wherein the source node is the node initiating an activity, the target node is the node receiving the activity, and the timestamp indicates with a certain temporal granularity the time when an interaction between the source node and the target node occurs. For example, a time-bound community may be the above group {A, B, C, D, E} in FIG. 1, and accordingly the temporal edge indicated by 06/22 15:36 (29094) is a temporal edge within the time-bound community. This temporal edge indicates that a transfer occurs from the node B (i.e., the source node) within the time-bound community to the node A (i.e., the target node) within the time-bound community at 15:36 on June 22, with a corresponding timestamp of 29094. The temporal edge indicated by 06/02 10:42 (0) is a temporal edge between different time-bound communities.

This temporal edge indicates that a transfer occurs from a node H (i.e., the source node) outside the time-bound community to the node B (i.e., the target node) within the time-bound community at 10:42 on June 2, with a corresponding timestamp of 0.

By way of example, the index structure may comprise an index of out-degree distribution, an index of in-degree distribution, and an index of timestamp distribution. For example, the out-degree distribution may be in a form of power-law distribution, meaning that the out-degrees of nodes in a time-bound community follow a power-law distribution; and the index of out-degree distribution records out-degrees corresponding to different probability values. The in-degree distribution may be in a form of power-law distribution, meaning that the in-degrees of nodes in a time-bound community follow a power-law distribution; and the index of in-degree distribution records in-degrees corresponding to different probability values. The timestamp distribution may be in a form of normal distribution, meaning that the timestamps of temporal edges in a time-bound community follow a normal distribution; and the index of timestamp distribution records timestamps corresponding to different probability values.

In one possible implementation, constructing the index structure that is transferable between different time-bound communities includes: selecting a time-bound community including the largest number of nodes from the plurality of time-bound communities, and establishing an index of out-degree distribution and an index of in-degree distribution for the time-bound community including the largest number of nodes; and selecting a time-bound community with the longest time window from the plurality of time-bound communities, and establishing an index of timestamp distribution for the time-bound community with the longest time window.

Since a ratio of the numbers of temporal edges in different time-bound communities is usually the same as a ratio of the numbers of nodes in the time-bound communities, and a time-bound community including the largest number of nodes has the largest scale and is mostly sampled among the plurality of time-bound communities, the index of out-degree distribution and the index of in-degree distribution established for the time-bound community having the largest number of nodes may be transferred to other time-bound communities which are of smaller scales and less sampled. A time-bound community with the longest time window is active for the longest time. An index of timestamp distribution is established for this time-bound community. When that index of timestamp distribution is used in any other time-bound community, an intermediate value may be firstly adopted from the timestamp distribution, and then the intermediate value may be linearly adjusted to the time window of that any other time-bound community, allowing the transfer of the index of timestamp distribution from the time-bound community with the longest time window to a time-bound community with a shorter time window.

Thus, due to the transferability of the index structure between different time-bound communities, the index structure is only established for the time-bound community with the largest number of nodes and the time-bound community with the longest time window, while other time-bound communities may reuse the already established index structure, enabling efficient generations of a large number of temporal edges within and between the time-bound communities under the constraints of specific distributions (i.e., out-degree distribution, in-degree distribution, and timestamp distribution). Thus, an aspect of the present disclosure may provide at least one of the following technical advantages: the run time and/or memory space of at least one computer can be saved for generating a temporal graph with time-bound communities, for example in the field of computer graphics.

By way of example, the specific types and parameters of the out-degree distribution $\pi_o$, in-degree distribution $\pi_i$, and timestamp distribution It may be specified by the user as required. By establishing the index of out-degree distribution, the index of in-degree distribution, and the index of timestamp distribution that are transferable between different time-bound communities, it is possible to simulate the user-specified distributions and efficiently generate temporal edges that conform to the user-specified distributions.

Step 304: Generating, based on the nodes included in each of the plurality of time-bound communities, the time window of each of the plurality of time-bound communities, and the temporal edges within each of the plurality of time-bound communities and/or between different time-bound communities of the plurality of time-bound communities, a temporal graph of the target scenario.

According to the embodiments of the present disclosure, a set of nodes in a target scenario is grouped to obtain nodes included in each of a plurality of time-bound communities; the numbers of nodes included in the plurality of time-bound communities follow a power-law distribution; a time window is generated for each of the plurality of time-bound communities, wherein the starting times of the time windows corresponding to the plurality of time-bound communities follow a uniform distribution, and the lengths of the time windows corresponding to the plurality of time-bound communities follow a power-law distribution; index structures that are transferable between different time-bound communities are constructed, and temporal edges within each of the plurality of time-bound communities and/or temporal edges between different time-bound communities of the plurality of time-bound communities are generated based on the nodes included in the respective time-bound communities, the time windows of the respective time-bound communities, and the index structures; and a temporal graph of the target scenario is generated based on the nodes included in each of the plurality of time-bound communities, the time window of each of the plurality of time-bound communities, and the temporal edge within each of the plurality of time-bound communities and/or between different time-bound communities of the plurality of time-bound communities. By this, through the three phases of node grouping, time window binding, and temporal edge linking, a temporal graph with time-bound communities is generated, wherein the numbers of nodes included in the time-bound communities, the starting times of the time windows of the time-bound communities, the lengths of the time windows of the time-bound communities, and the like all follow specific distributions, which may reflect the real situation of network distribution. By way of example, the user may specify parameters for a specific distribution. It is also possible to quickly generate the temporal edges based on the index structure transferable between different time-bound communities, thereby generating a temporal graph that contains time-bound communities and meets the user requirements in a flexible and efficient manner.

Figure 5:
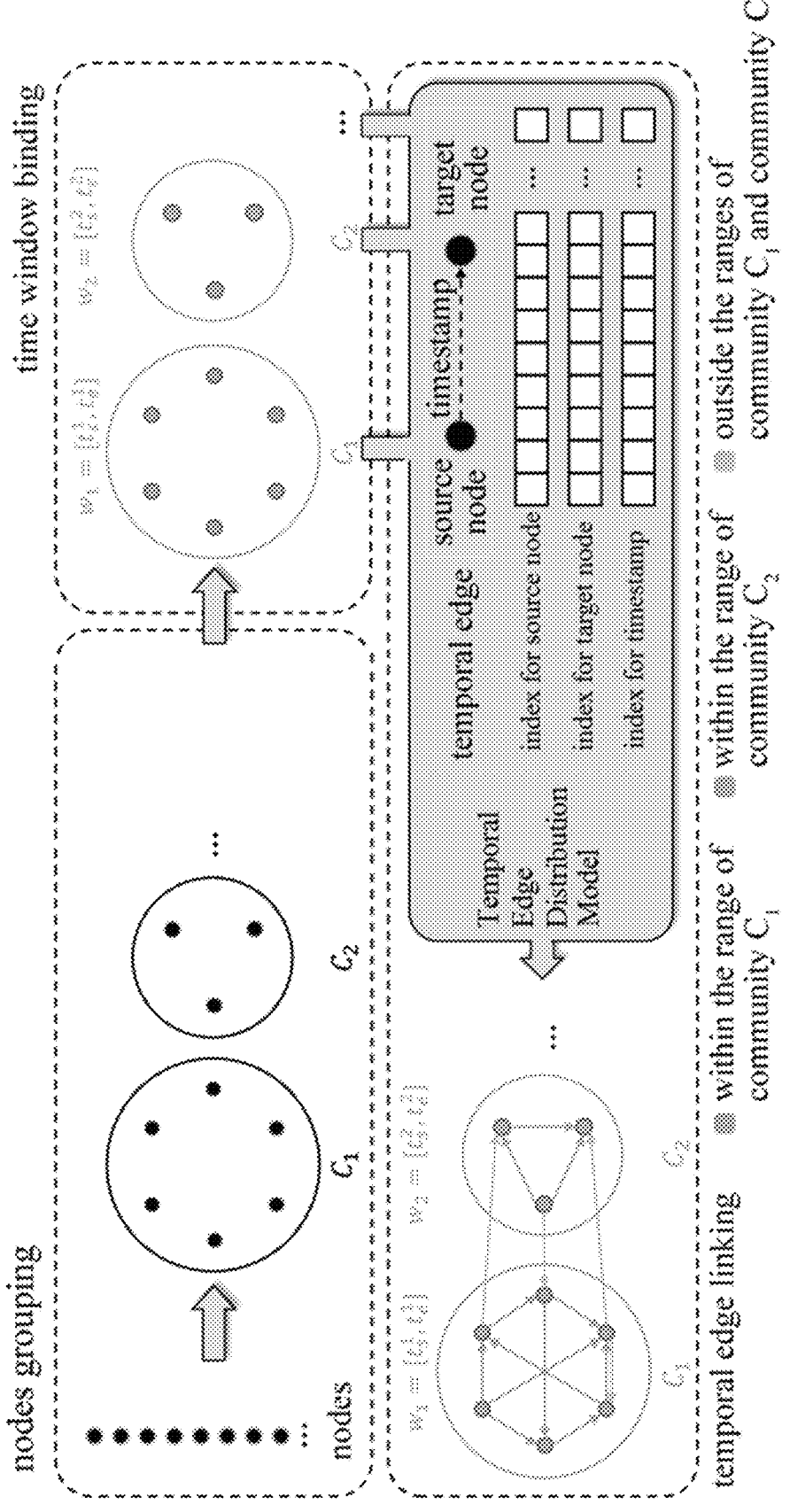
FIG. 5 shows a schematic flowchart of a method for generating a temporal graph with time-bound communities according to an embodiment of the present disclosure.

By way of example, FIG. 5 shows a schematic flowchart of a method for generating a temporal graph with time-bound communities according to an embodiment of the present disclosure. As shown in FIG. 5, in the node grouping phase, a user-specified number of nodes are grouped to obtain the nodes included in each of the plurality of time-bound communities. Only communities $C_1$ and $C_2$ of the plurality of time-bound communities are shown in the figure, with the community $C_1$ including 6 nodes and the community $C_2$ including 3 nodes. In the time window binding phase, a time window is generated for each of the plurality of time-bound communities obtained from the node grouping phase, wherein a time window $w_1$ of the community $C_1$ is represented as $$[t_s^1, t_e^1],$$

and a time window $w_2$ of the community $C_2$ is represented as $$[t_s^2, t_e^2];$$

a green color means being within a range of the community $C_1$, green dots are the nodes in the community $C_1$; a blue color means being within a range of the community $C_2$, and blue dots are the nodes in the community $C_2$. In the temporal edge linking phase, by a temporal edge distribution model, the index of out-degree distribution, the index of in-degree distribution, and the index of timestamp distribution are constructed, and the temporal edges within each of the plurality of time-bound communities obtained from the time window binding phase and the temporal edges between different time-bound communities of the plurality of time-bound communities are generated, wherein green directed edges are the temporal edges within the community $C_1$, and blue directed edges are the temporal edges within the community $C_2$; a red color means being outside the range of the communities $C_1$ and $C_2$, and red directed edges are the temporal edges between the communities $C_1$ and $C_2$; therefore a temporal graph with time-bound communities, such as $C_1$ and $C_2$, is generated. The temporal edge distribution model may enable operations in the temporal edge linking phase and is primarily used to simulate user-specified distributions and generate a large number of temporal edges. Due to the constructed index structures transferable between different time-bound communities, it is possible to efficiently generate a temporal edge which follows the user-specified distribution within a O(1) time.

Hereinafter, the above three phases for generating a temporal graph with time-bound communities will be further explained.

I. Node Grouping Phase (Step 301)

Considering that in real complex networks there are often overlapping structures, the overlap between time-bound communities implies that the same node may participate in different activities corresponding to a plurality of time-bound communities in different time windows, reflecting behaviors in various actual scenarios. For example, in an online discussion network, the same user may participate in multiple discussions on different topics; in a financial transfer network, some individuals may engage in multiple transactions; and at an academic conference, core participants are more likely to engage in many academic activities.

In one possible implementation, the plurality of time-bound communities comprises a preset number of overlapping structures, wherein each of the overlapping structures comprises shared node(s) present in two time-bound communities. Thus, when a set of nodes in a target scenario is grouped, the numbers of nodes included in the plurality of obtained time-bound communities follow a power-law distribution; meanwhile, the overlapping structures between the time-bound communities are taken into account so as to make the distribution of the plurality of time-bound communities comply more with the situation of real networks.

By way of example, the number of overlapping structures (which may also be referred to as the number of overlapping relationships between the time-bound communities) may be specified by the user as required.

A degree of a shared node exceeds degrees of other nodes in either of the two time-bound communities, and a ratio of the number of the shared nodes to the number of the nodes in either of the two time-bound communities is a preset value. The degree of the shared node may include both the out-degree and in-degree of the shared node, and usually a node's out-degree is positively correlated with its in-degree. By way of example, m overlapping structures in the form of $(i, j, \Omega)$ may be generated, wherein i and j are identifiers of two time-bound communities to which the overlapping structure belongs, and $\Omega \in [0,1]$ is the time-bound community overlapping parameter, which may take a value such as 0.2 or 0.5, for quantifying a degree of overlap, with $\Omega$ being a preset value. If $i<j$, nodes with high degrees and accounting for a proportion of $\Omega$ may be selected from the time-bound community i as the shared nodes between the time-bound community i and the time-bound community j; that is, a ratio of the number of the shared nodes to the number of the nodes in the time-bound community i is $\Omega$, and thus an overlapping structure is obtained. Such an overlapping structure reflects a tendency of nodes with high connectivity participating in multiple time-bound communities, which is in line with the situation of real networks.

II. Time Window Binding Phase (Step 302)

FIG. 6 shows a flowchart of generating a time window for each of the plurality of time-bound communities according to an embodiment of the present disclosure. As shown in FIG. 6, the process may comprise the following steps:

Step 601: An expectation of a length of the time window of a first time-bound community is determined based on the number of nodes included in the first time-bound community.

Figure 7:
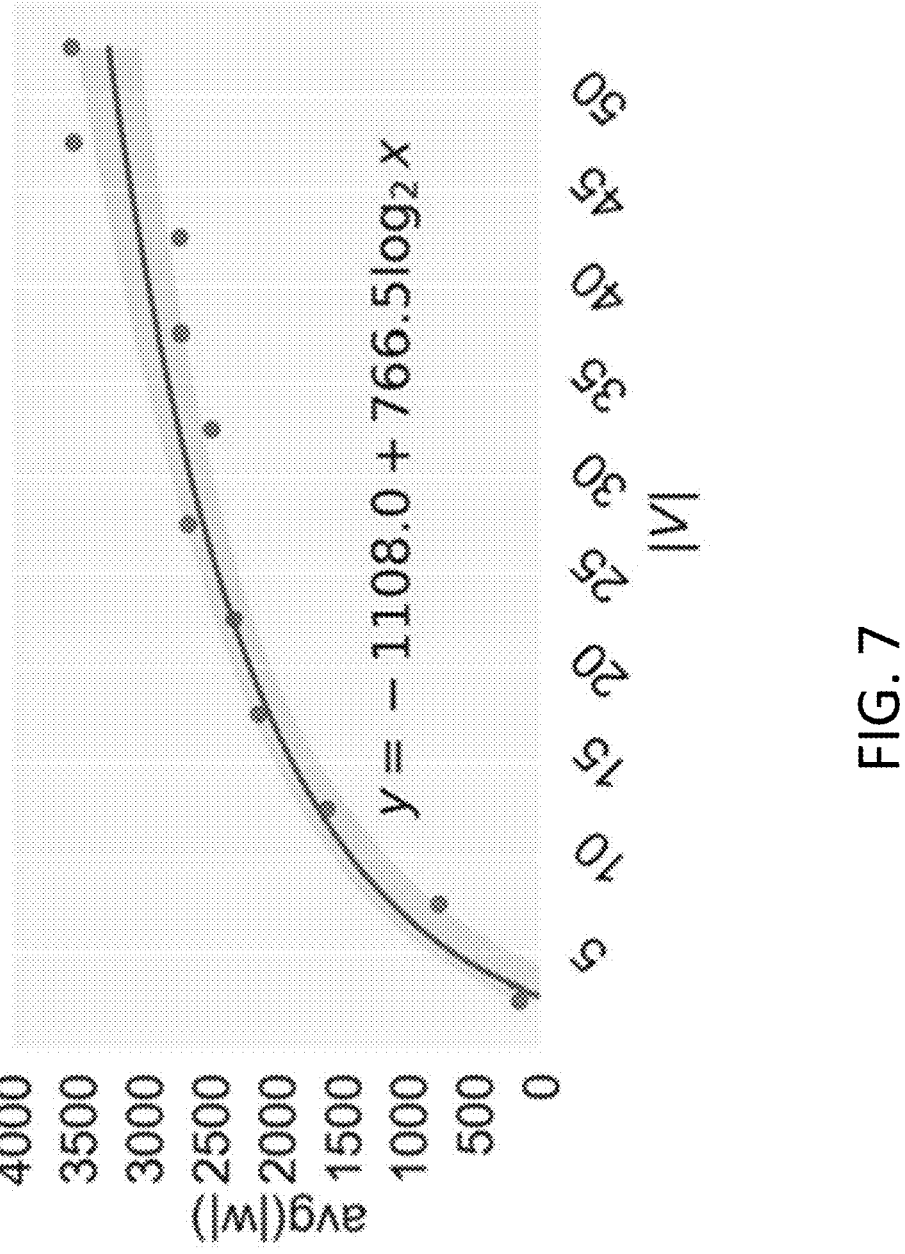
FIG. 7 shows a schematic diagram of an average length of time windows within each bucket in a network A according to an embodiment of the present disclosure.

Considering that an average value of the lengths of the time windows of the time-bound communities may be correlated to the numbers of nodes included in the time-bound communities, it may affect the generation of the time window for each time-bound community. By way of example, by extracting data of the network A from the website "Math Overflow", the time-bound communities in the network A may be grouped into 11 buckets based on the number of nodes included in the respective time-bound communities $|V|$ $\{5i \leq |V| < 5 \ (i+1) \ |i \in \ \mathbb{N}, \ 0 \leq i \leq 9\} \cup \{|V| \leq 50\}$. FIG. 7 shows a schematic diagram of an average length of the time windows within each bucket in the network A according to an embodiment of the present disclosure. By analyzing FIG. 7, it is found that there is a logarithmic correlation between the average value of the lengths of the time windows of the time-bound communities and the number of nodes included in the time-bound communities, which may be expressed by the following formula (1):

$$avg(|w|) = b + a \log(|V|), \qquad (1)$$

where a and b are constants, $|V|$ represents the number of nodes included in the time-bound communities, and $|w|$ represents the lengths of the time windows of the time-bound communities. By way of example, from a linear regression calculation the constant a=766.5 and the constant b=−1108.0, so the average length of the time windows avg(|w|) of the time communities in the network A has a relationship with the number of nodes |V| included in the time-bound communities as shown in FIG. 7, which may be expressed as y=−1108.0+766.5 log$_2$(x), where x represents a value of the number of nodes |V|, and y represents a value of the average length of the time windows avg (|w|).

The logarithmic correlation shown in the formula (1) is in line with intuition, that is, larger time-bound communities tend to be active for longer times.

To generate a length of a time window of a time-bound community with a number of nodes|V|, an average value of the lengths of the time windows avg (|w|) of the time-bound communities may be calculated using the above formula (1). Due to the law of large numbers, the average value of the lengths of the time windows avg (|w|) of the time-bound communities is equivalent to an estimated value of a theoretical expectation $\mathbb{E}$ (|w|).

In one possible implementation, determining the expectation of the length of the time window of the first time-bound community based on the number of nodes included in the first time-bound community may include: calculating the average value of the lengths of the time windows of the first time-bound community based on the number of nodes included in the first time-bound community, wherein there is a logarithmic correlation between the average value of the lengths of the time windows of the first time-bound community and the number of nodes included in the first time-bound community; and determining the average value of the lengths of the time windows of the first time-bound community as the expectation of the length of the time window of the first time-bound community. By way of example, by substituting the number of nodes |V| included in the first time-bound community into the above formula (1), the average value of the lengths of the time windows avg (|w|) of the first time-bound community may be calculated; and the avg (|w|) may be taken as the expectation of the length of the time window of the first time-bound community.

Step 602: A probability density function of the length of the time window of the first time-bound community is determined based on the expectation of the length of the time window of the first time-bound community.

By way of example, a specific power-law distribution that the length of the time window |w| follows may be further derived based on the expectation $\mathbb{E}$ (|w|) of the length of the time window |w|. For simplicity, the length of the time window |w| may be considered as a continuous variable from 1 to T, and the probability density function $\pi_{|w|}(x)$ of the length of the time window |w| is expressed by formula (2) below:

$$\pi_{|w|}(x) = \alpha \cdot x^{-\eta}, \tag{2}$$

where x represents a value of the length of the time window, which ranges from 1 to T, with T being a maximum value of the length of the time window; $\eta > 1$ is a parameter controlling a decline rate of the probability density function; and a is a normalization constant, which satisfies $$\int_1^T \pi_{|w|}(x)dx = 1.$$

The constant $\alpha$ is expressed by formula (3) below:

$$\alpha = \frac{\eta - 1}{1 - T^{1-\eta}}, \tag{3}$$

where $\eta$ is a parameter for controlling the decline rate of the probability density function, and T is the maximum value of the length of the time window; thus the expectation value $\mathbb{E}$ (|w|) of the length of the time window |w| may be expressed by formula (4) below:

$$\mathbb{E}(|w|) = \int_1^T x\pi_{|w|}(x)dx = \frac{\eta - 1}{\eta - 2} \cdot \frac{T^{2-\eta} - 1}{T^{1-\eta} - 1}, \tag{4}$$

where $\eta$ is a parameter for controlling the decline rate of the probability density function and is not equal to 1 or 2; T is the maximum value of the length of the time window; $\pi_{|w|}(x)$ is the probability density function; and |w| represents the length of the time window. After the expectation $\mathbb{E}$ (|w|) of the length of the time window |w| is determined, since the formula (4) is monotonically increasing with respect to $\eta$, a binary search may be carried out to approximate $\eta$, and then in conjunction with the formula (3), the probability density function $\pi_{|w|}(x)$ of the length of the time window |w| in the formula (2) may be obtained, which is related only to the expectation $\mathbb{E}$ (|w|) of the length of the time window |w|. The probability density function is a specific expression of the power-law distribution that the lengths of the time windows follow.

By way of example, the probability density function of the length of the time window of the first time-bound community in the formula (2) may be obtained based on the expectation of the length of the time window of the first time-bound community in combination with the above formula (3) and formula (4). The probability density function is a specific expression of the power-law distribution that the length of the time window of the first time-bound community follows. Specifically, avg (|w|) may be substituted into the formula (4) as a value of $\mathbb{E}$ (|w|) to obtain a value of $\eta$, the value of $\eta$ may be substituted into the formula (3) to obtain a value of $\alpha$, and the values of $\alpha$ and $\eta$ are substituted into the formula (2) to thus obtain the probability density function.

Step 603: A target length of the time window of the first time-bound community is obtained by sampling the probability density function of the length of the time window of the first time-bound community.

By way of example, the target length of the time window of the first time-bound community may be obtained by sampling the probability density function shown in the above formula (2), so that a length of time window |w$_i$| of the first time-bound community is sampled from a specified power-law distribution, wherein i represents an identifier of the first time-bound community. The sampling method may be selected based on related techniques, which is not limited in the present disclosure.

Step 604: A starting time of the target time window of the first time-bound community is obtained by sampling the length of the target time window of the first time-bound community and a preset time range.

The preset time range indicates an interval within which the times when interactions between nodes may take place are included, and a value of the preset time range may be set by the user as required.

By way of example, the starting time of the target time window of the first time-bound community can be obtained by a random sampling of $\alpha$ uniform distribution, wherein an upper limit and a lower limit of the uniform distribution are respectively the times corresponding to a difference between the earliest latest possible time in the network and the length of the target time window, and a difference between the latest possible time in the network and the length of the target time window, thereby determining the starting position of the target time window of the first time-bound community on the time axis.

Step 605: The target time window of the first time-bound community is determined based on the starting time of the target time window of the first time-bound community and the length of the target time window of the first time-bound community.

By way of example, an end time of the target time window of the first time-bound community is obtained by summing up the starting time of the target time window of the first time-bound community and the length of the target time window of the first time-bound community. A time period between the end time and the starting time is the target time window.

Thus, a reasonable time window is bound to each time-bound community through the above steps 601-605.

According to the embodiments of the present disclosure, in the time window binding phase, the expectation of the length of the time window of the first time-bound community is first determined from the number of nodes included in the first time-bound community, so as to determine the probability density function of the length of the time window of the first time-bound community, which is the specific expression of the power-law distribution that the length of the time window of the first time-bound community follows. Subsequently, the power-law distribution is randomly sampled to obtain the length of the time window of the first time-bound community, and the uniform distribution is randomly sampled to obtain the starting time of the time window of the first time-bound community. Ultimately, the time window of the first time-bound community is generated. In this way, the time window of each time-bound community is generated based on the rules of real data sets, that is, the starting times of the time windows of the time-bound communities follow the uniform distribution, the lengths of the time windows of the time-bound communities follow the power-law distribution, and a logarithmic correlation between the average length of the time windows of the time-bound communities and the numbers of nodes included in the time-bound communities is maintained.

Figure 8:
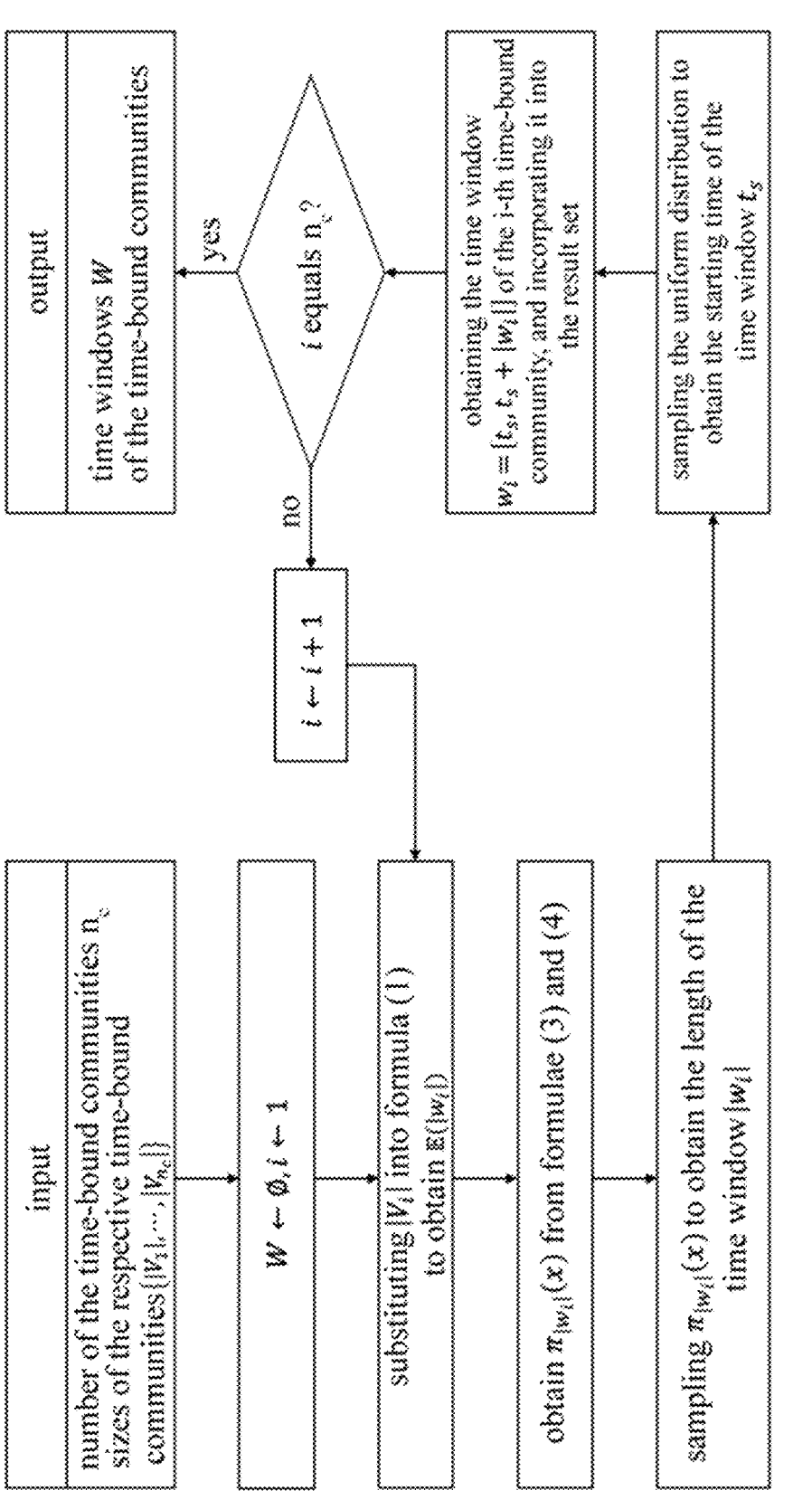
FIG. 8 shows a flowchart of a method for generating a temporal graph with time-bound communities according to an embodiment of the present disclosure.

By way of example, FIG. 8 shows a flowchart of a method for generating a temporal graph with time-bound communities according to an embodiment of the present disclosure. As shown in FIG. 8, a number of time-bound communities n and the sizes of the respective time-bound communities $\{|V_1|, \ldots, |V_n|\}$ (i.e., the numbers of nodes included) are obtained. A result set W is initially an empty set. The size $|V_i|$ of an i-th time-bound community is substituted into the above formula (1) to obtain the expectation of the length of the time window $\mathbb{E}(|w_i|)$ of the i-th time-bound community. With the above formula (3) and formula (4), the probability density function $\pi_{|w_i|}(x)$ of the length of the time window of the i-th time-bound community is obtained. The length of the time window $|w_i|$ of the i-th time-bound community is obtained by sampling the probability density function $\pi_{|w_i|}(x)$. Then, the starting time of the time window $t_s$ of the i-th time-bound community is obtained by sampling the uniform distribution. Thus, the time window $w_i=(t_s, t_s+|w_i|)$ of the i-th time-bound community may be obtained, and may be incorporated into the result set W. In this way, all the n time-bound communities are traversed with the above operations repeated, to obtain the time windows of the respective time-bound communities; and all the time windows are sequentially incorporated into the result set W.

III. Temporal Edge Linking Phase (Step 303)

The temporal edge linking phase may be divided into two parts, one is generating temporal edges within each of $\alpha$ plurality of time-bound communities, and the other is generating temporal edges between different time-bound communities of $\alpha$ plurality of time-bound communities.

Since each temporal edge consists of a source node, a target node, and a timestamp, distribution restrictions are imposed on the three elements that make up a temporal edge during the process of generating temporal edges. By way of example, first, for each source node u, an out-degree is assigned based on the index of out-degree distribution; then, for each temporal edge corresponding to the out-degree of the source node u, a target node v is determined based on the index of in-degree distribution; and finally, a timestamp of the temporal edge between u and v is determined based on the index of timestamp distribution. The specific types and parameters of the out-degree distribution, in-degree distribution, and timestamp distribution may be specified by the user as required.

By way of example, for the temporal edges within each time-bound community, since the time-bound community has both topological closeness and temporal closeness, the nodes and temporal edges within the same time-bound community spontaneously follow a common distribution. Therefore, the temporal edges within the time-bound community may be generated by modeling this distribution.

Figure 9:
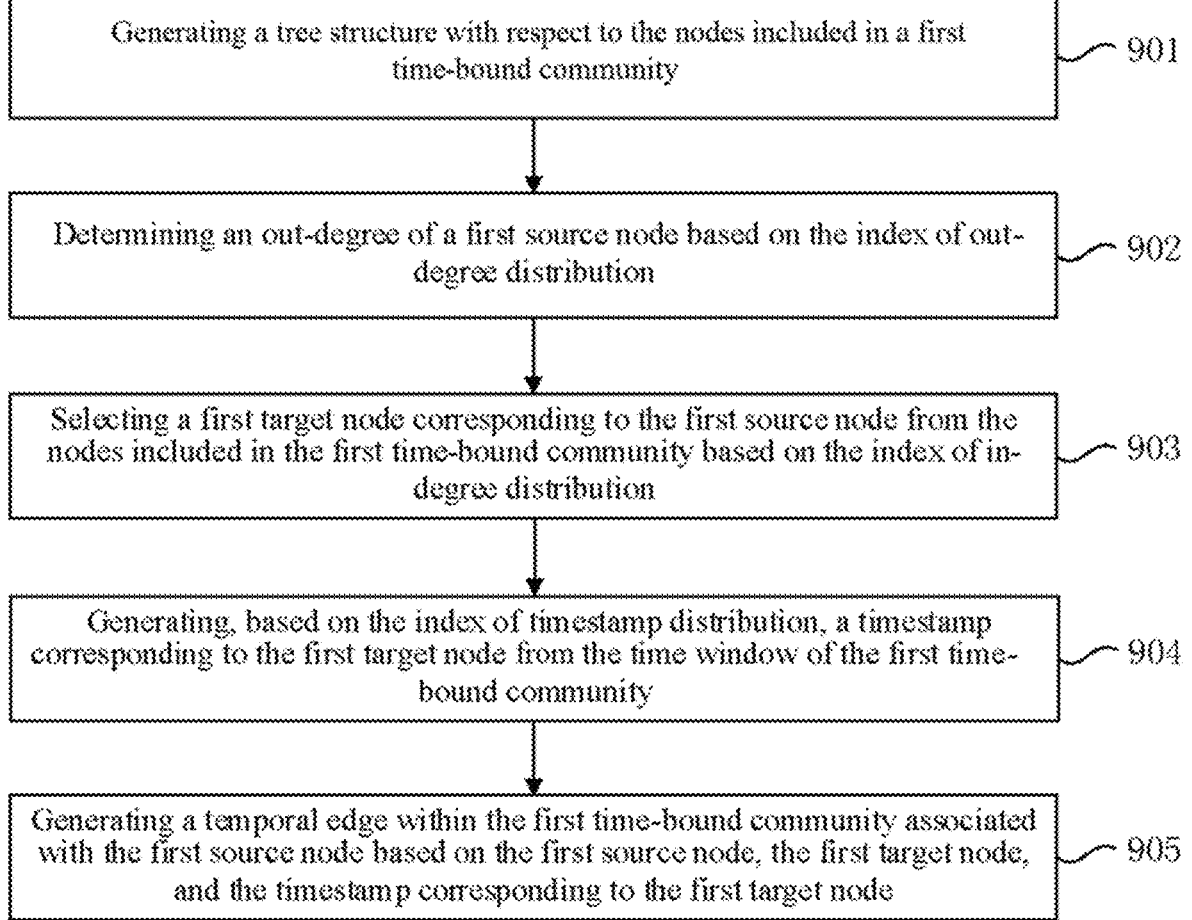
FIG. 9 shows a flowchart of a method for generating a temporal edge within each time-bound community according to an embodiment of the present disclosure.

FIG. 9 shows a flowchart of a method for generating temporal edges within each time-bound community according to an embodiment of the present disclosure. As shown in FIG. 9, the method may comprise the following steps:

Step 901: A tree structure with respect to nodes included in a first time-bound community is generated, wherein the first time-bound community is any time-bound community of the plurality of time-bound communities.

By way of example, the tree structure with respect to the nodes included in the first time-bound community may be generated by an existing tree structure generation method.

Step 902: An out-degree of a first source node is determined based on the index of out-degree distribution, wherein the first source node is any source node in the tree structure.

By way of example, the index of out-degree distribution may be established for a time-bound community with the largest number of nodes among a plurality of time-bound communities. Therefore, if the first time-bound community is the time-bound community with the largest number of nodes among the plurality of time-bound communities, the index of out-degree distribution needs to be established for the first time-bound community; and if the first time-bound community is not the time-bound community with the largest number of nodes among the plurality of time-bound communities, the index of out-degree distribution established for the time-bound community with the largest number of nodes among the plurality of time-bound communities may be directly reused.

The following is an exemplary description of the process of establishing the index of out-degree distribution for the first time-bound community when the first time-bound community is the time-bound community with the largest number of nodes among the plurality of time-bound communities.

The generation of an out-degree $d_o$ of a source node faces the problem of how to randomly sample a given out-degree distribution $\pi_o$. When the out-degree distribution $\pi_o$ is a continuous distribution, the out-degree distribution may be discretized as shown in formulae (5) and (6).

$$f_o(x) = \begin{cases} \alpha\pi_o(x), & x \in \{(d_o)_{min}, \ldots (d_o)_{max}\} \\ 0, & \text{otherwise} \end{cases}, \qquad (5)$$

$$F_o(x) = \alpha\sum\nolimits_{k=(d_o)_{min}}^{x} \pi_o(k), \qquad (6)$$

where $f_o(x)$ is a probability mass function of the out-degree after discretization; $F_o(x)$ represents a cumulative distribution function of the out-degree; $\pi_o$ represents an out-degree distribution; $(d_o)_{min}$ and $(d_o)_{max}$ are the minimum value and the maximum value of the out-degree $d_o$, respectively; and $\alpha$ is a constant with $$\alpha\sum\nolimits_{k=(d_o)_{min}}^{(d_o)_{max}} \pi_o(k) = 1$$

holding true.

Next, the out-degree may be generated through a strategy of threshold-based inverse transform sampling. By way of example, an index structure as shown in the following formula (7) may be constructed to approximate $$F_o^{-1}(x), \qquad 35$$

which is the inverse function of $F_o(x)$:

$$M_o(y) = \arg\max_{x} F_o(x) \le y, \qquad (7)$$

where $y \in \{i \in | i \in \mathbb{N}+, \in <0, i \in \le 1\}$ represents a probability value recording a value of the corresponding random variable;

$$y = \left\lfloor \frac{p}{\epsilon} \right\rfloor \cdot \epsilon,$$

with p representing any probability value; and $M_o(y)$ records a value of the out-degree x every time the probability value increases by $\in$ units. Obviously, $M_o(y)$ is a linear approximation on $$F_o^{-1}(x), \text{ as } \epsilon \to 0, M_o(y) \to F_o^{-1}(x);$$

and $M_o(y)$ is the index of out-degree distribution. By way of example, upper and lower thresholds may be set for the parameter $\in$ to facilitate a balance of approximation precision and computational cost.

Further, in determining the out-degree of the first source node based on the index of out-degree distribution, to sample the out-degree distribution $\pi_o$, a uniform distribution $U(0,1)$ can be sampled first to obtain a probability p; then, based on the probability p and $$\epsilon, y = \left\lfloor \frac{p}{\epsilon} \right\rfloor \cdot \epsilon$$

is calculated; and based on the index of out-degree distribution as shown in formula (7), the out-degree of the first source node, $$M_o\left(\left\lfloor \frac{p}{\epsilon} \right\rfloor \cdot \epsilon\right),$$

is obtained.

Figure 10:
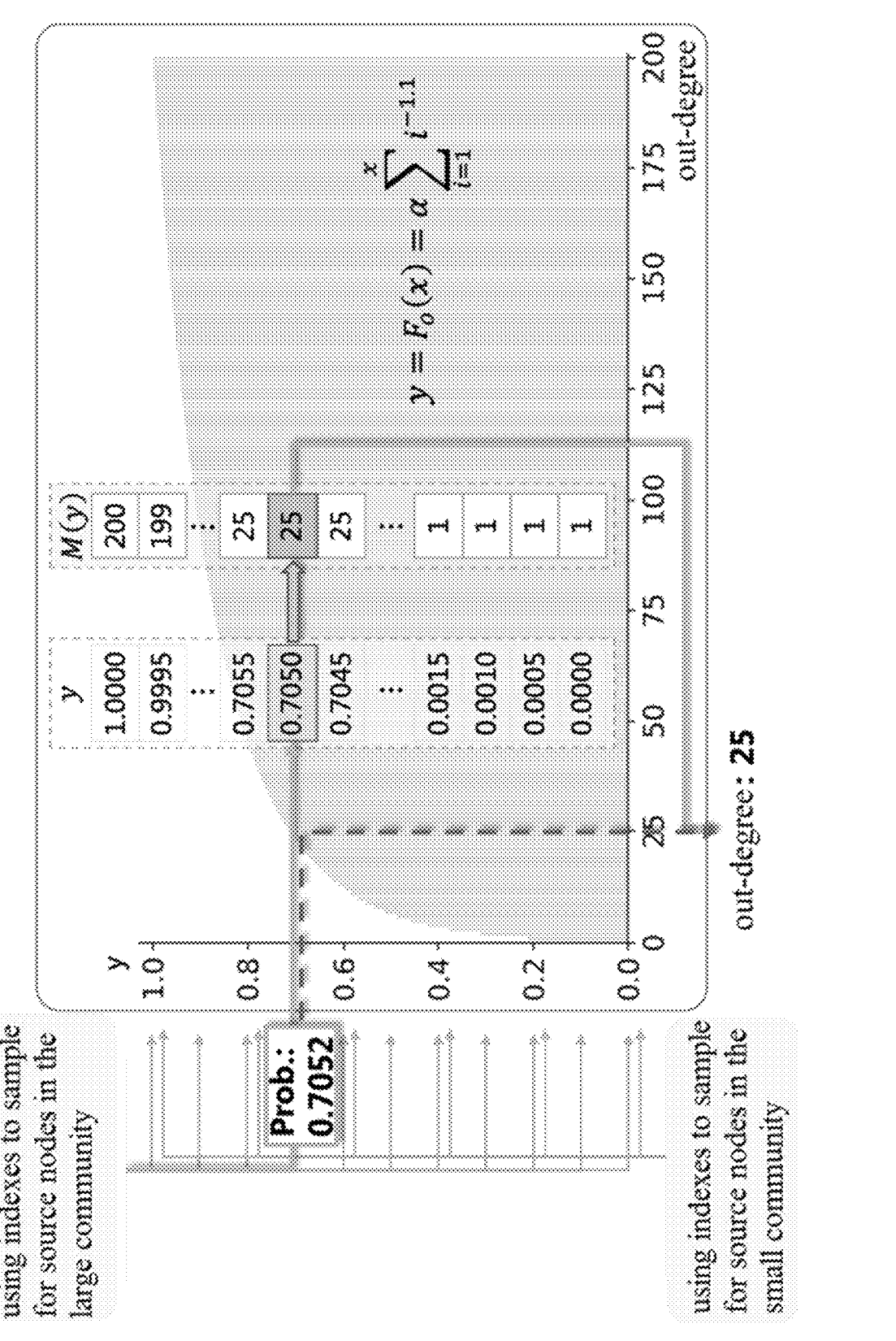
FIG. 10 shows a schematic diagram of generating an out-degree based on an index of out-degree distribution according to an embodiment of the present disclosure.

For example, FIG. 10 shows a schematic diagram of generating an out-degree based on an index of out-degree distribution according to an embodiment of the present disclosure. As shown in FIG. 10, the out-degree of the source node follows a power-law distribution with an exponent of $-1.1$; $(d_o)_{min}=1$, and $(d_o)_{max}=200$; and $\in =0.005$ in the index of out-degree distribution. Given a random probability p=0.7052 that follows a uniform distribution, an out-degree $M_o(0.7052)=25$ may be generated based on the index of out-degree distribution.

Since a tree structure with respect to the nodes included in the first time-bound community was generated in the above step 901, that is, the generation of the tree structure precedes the establishment of the index of out-degree distribution, the number of remaining temporal edges to be generated may conflict with the given out-degree distribution; that is, a relationship as shown in formula (8) below may exist:

$$n_e - n_v \ne n_v\alpha\sum\nolimits_{k=(d_o)_{min}}^{(d_o)_{max}} k\pi_o(k) = \mathbb{E}(d_o), \qquad (8)$$

where $n_v$ represents the number of nodes in the first time-bound community; ne represents the number of temporal edges in the first time-bound community; $\pi_o$ represents the out-degree distribution; and $\alpha$ is a constant. To match the expectation $\mathbb{E}[d_o]$ of the out-degree $d_o$ with $n_e$-$n_v$, the maximum value $(d_o)_{max}$ of the out-degree may be adjusted.

As such, after the index of out-degree distribution is established for the first time-bound community, when determining an out-degree of a source node in another time-bound community, the index of out-degree distribution established for the first time-bound community may be directly reused without having the establishment repeated in another time-bound community.

$n'_e$ and $n'_v$ are provided to represent the number of temporal edges and the number of nodes in another time-bound community, respectively; there is an equation of $$\frac{n_e}{n'_e} = \frac{n_v}{n'_v}.$$

Accordingly, there is a relationship as shown in formula (9) below:

$$n'_e - n'_v = n'_v\alpha\sum\nolimits_{k=(d_o)_{min}}^{(d_o)_{max}} k\pi_o(k). \qquad (9)$$

As can be seen from formula (9), the index of out-degree distribution shown in the above formula (7) established for the first time-bound community is transferable, and may be directly applied to another time-bound community without further adjustment. For example, the purple arrows in FIG. 10 indicate that the index of out-degree distribution established for a large time-bound community (i.e., the time-bound community with the largest number of nodes) may be reused by a small time-bound community (i.e., a time-bound community with a relatively smaller number of nodes).

Figure 11:
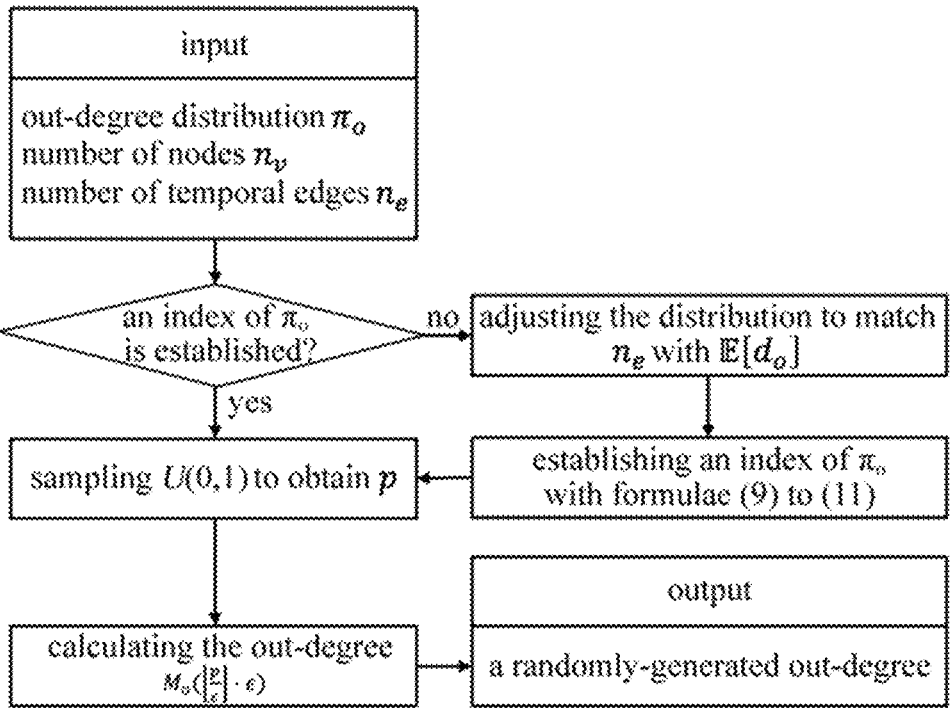
FIG. 11 shows a flowchart of a method for generating an out-degree of a first source node according to an embodiment of the present disclosure.

By way of example, FIG. 11 shows a flowchart of a method for generating an out-degree of a first source node according to an embodiment of the present disclosure. As shown in FIG. 11, an out-degree distribution $\pi_o$, a number of nodes $n_v$ in the first time-bound community, and a number of temporal edges ne in the first time-bound community specified by the user are obtained; first, it is determined whether an index of the out-degree distribution $\pi_o$ is established, and if it is not established, the distribution may be adjusted to match the number of temporal edges $n_e$ in the first time-bound community and the expectation $\mathbb{E}[d_o]$ of the out-degree, and then an index of the out-degree distribution $\pi_o$ is established through the above formulae (5) to (7); and if an index of the out-degree distribution $\pi_o$ has been established, the uniform distribution U(0,1) is sampled for a probability $$p, \left\lfloor \frac{p}{\epsilon} \right\rfloor \cdot \epsilon$$

is calculated, and the out-degree do of the first source node is generated randomly through the established index of the out-degree distribution $\pi_o$.

Step 903: A first target node corresponding to the first source node is selected from the nodes included in the first time-bound community based on the index of in-degree distribution, wherein the number of the first target nodes is the same as the out-degree of the first source node.

By way of example, the index of in-degree distribution may be established for the time-bound community with the largest number of nodes among the plurality of time-bound communities. Therefore, if the first time-bound community is the time-bound community with the largest number of nodes among the plurality of time-bound communities, the index of in-degree distribution needs to be established for the first time-bound community; and if the first time-bound community is not the time-bound community with the largest number of nodes among the plurality of time-bound communities, the index of in-degree distribution established for the time-bound community with the largest number of nodes among the plurality of time-bound communities may be directly reused.

The following is an exemplary description of the process of establishing the index of in-degree distribution for the first time-bound community when the first time-bound community is the time-bound community with the largest number of nodes among the plurality of time-bound communities.

By way of example, nodes within a time-bound community may be numbered, and it is assumed that a node with a larger identification number tends to have a higher out-degree and in-degree. The rationality of this assumption is illustrated in two aspects: first, the out-degree and in-degree of a node tend to match each other, and the two indicate together a degree of importance of the node in the time-bound community; and second, if a correlation between the out-degree or in-degree of a node and the identification number of the node is not needed, a current node number sequence may be mapped to other node arrangements.

In selecting a target node of a temporal edge, if an in-degree threshold $d_i$ is used to find out nodes whose in-degrees do not exceed $d_i$, then all qualified in-degrees are related to the number of selected nodes, both of which increase with respect to $d_i$. Further, a total number of the selected nodes is equivalent to an identification number of a node with the largest in-degree $(d_i)$ Next, a relationship between a cumulative in-degree and a target identification number of node is determined. Given the in-degree distribution $\pi_I$, a probability mass function $f_{si}(x)$ and a cumulative distribution function $F_{si}(x)$ about the cumulative in-degree sum are calculated as follows:

$$f_{si}(x) = \begin{cases} \beta\alpha x\pi_i(x), & x \in \{(d_i)_{min}, \ldots, (d_i)_{max}\}, \\ 0, & \text{otherwise} \end{cases} \quad (10)$$

$$F_{si}(x) = \beta\alpha \sum_{k=(d_i)_{min}}^{x} k\pi_i(k), \quad (11)$$

where $(d_i)_{min}$ and $(d_i)_{max}$ are the minimum value and the maximum value of the in-degree $d_i$, respectively; and $\alpha$ and $\epsilon$ are constants, with $\alpha$ satisfying $$\alpha \sum_{k=(d_i)_{min}}^{(d_i)_{max}} \pi_i(k) = 1,$$

and $\epsilon$ satisfying $$\beta\alpha \sum_{k=(d_i)_{min}}^{(d_i)_{max}} k\pi_i(k) = 1.$$

The indexes of in-degree distribution $M_1(y)$, $M_2(y)$, $N_1(y)$, $N_2(y)$ are established as shown in formula (12) below:

$$\begin{cases} F_1(y) = F_{si}(d_1), N_1(y) = n_v\alpha \sum_{k=(d_i)_{min}}^{d_1} \pi_i(k), \\ F_2(y) = F_{si}(d_2), N_2(y) = n_v\alpha \sum_{k=(d_i)_{min}}^{d_2} \pi_i(k), \end{cases} \quad (12)$$

where $y \in \{i \in | i \in \mathbb{N}^+, \epsilon > 0, i \in \leq 1\}$; $d_1 = \arg\max_x F_{si}(x) \leq y$; $d_2 = \arg\min_x F_{si}(x) \geq y$; $n_v$ is the number of nodes in the time-bound community; and upper and lower thresholds are set for the parameter $\epsilon$, to facilitate a balance of approximation precision and computational cost.

Further, given a probability p that follows the uniform distribution U(0,1), a corresponding node identification number may be generated in a linearly approximated manner with the index of in-degree distribution composed of $F_1(y)$, $F_2(y)$, $N_1(y)$, and $N_2(y)$. The node indicated by the identification number is the target node.

Figure 12:
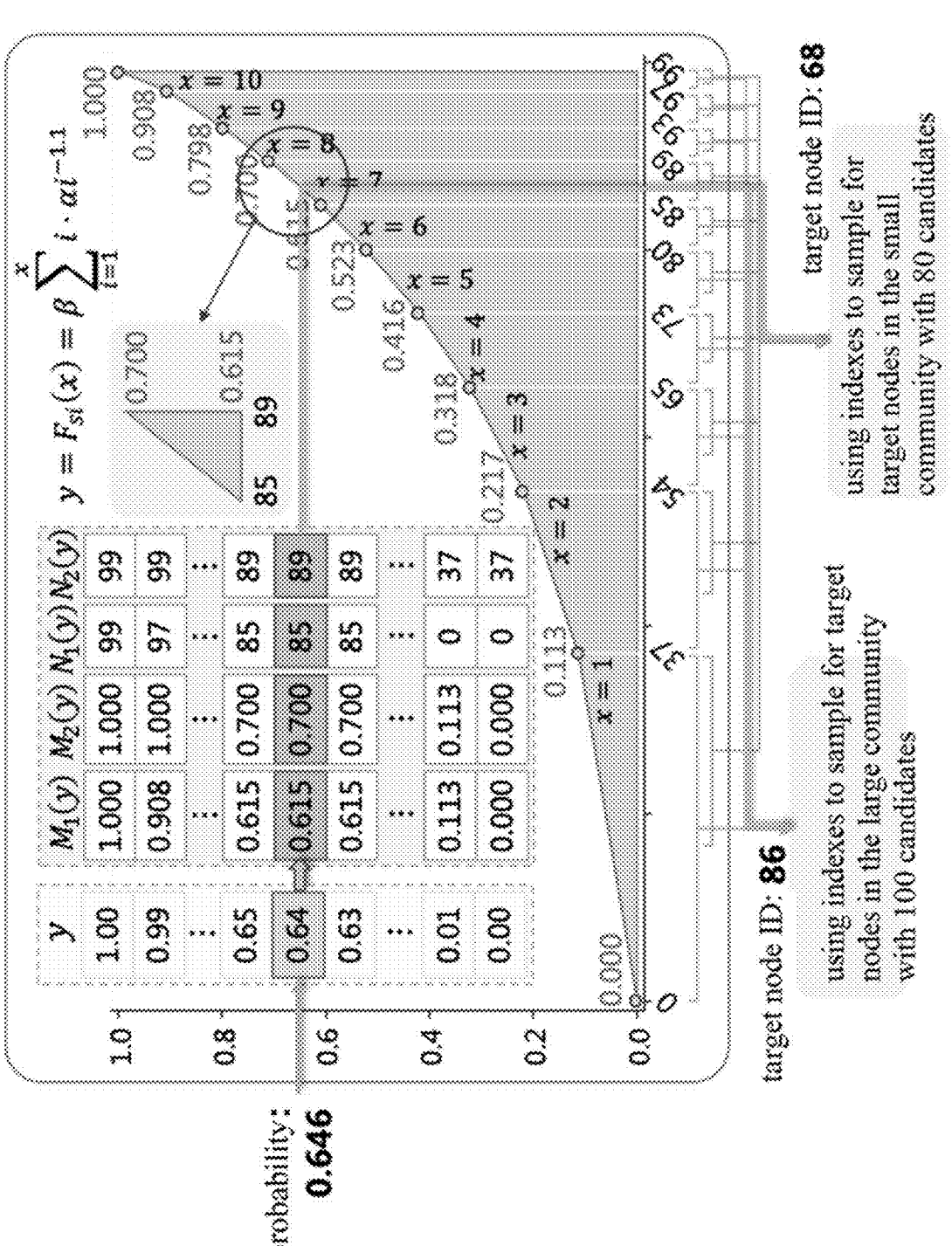
FIG. 12 shows a schematic diagram of determining a target node according to an embodiment of the present disclosure.

By way of example, FIG. 12 shows a schematic diagram of determining a target node according to an embodiment of the present disclosure. As shown in FIG. 12, the first time-bound community includes 100 nodes, and a target node is selected from these 100 nodes for a source node. The in-degrees of the nodes follow a power-law distribution with an adjusted exponent of −1.1, $(d_i)$ min=1, and $(d_i)_{max}$=10. The index of in-degree distribution as shown in formula (12) is established for the first time-bound community, with $\epsilon$=0.01. Given a random probability p=0.646, $$y = \left\lfloor \frac{p}{\in} \right\rfloor \cdot \in$$

$$p, y = \left\lfloor \frac{p}{\in} \right\rfloor \cdot \in$$

is calculated, resulting in a value of 0.64 for y. y=0.64 is substituted into the index of in-degree distribution to obtain $F_1(0.64)$, $F_2(0.64)$, $N_1(0.64)$, and $N_2(0.64)$, which enables the generation of a node identification number is calculated, and $$\left\lfloor N_1(0.64) + \frac{0.64 - F_1(0.64)}{F_2(0.64) - F_1(0.64)} (N_2(0.64) - N_1(0.64)) \right\rfloor = 86,$$

$$N_1(y) + \frac{y - F_1(y)}{F_2(y) - F_1(y)} \cdot (N_2(y) - N_1(y))$$

which means that the 86th node in the first time-bound community serves as a target node.

Due to the varying number of nodes in different time-bound communities, the corresponding ranges of node identification numbers in different time-bound communities also differ. To transfer the index of in-degree distribution established for the first time-bound community to another time-bound community, additional mapping of the identification number of the target nodes is required to adapt to the different ranges of node identification numbers. As shown in FIG. 12, the target nodes are assigned to different buckets based on their expected in-degrees. When the index of in-degree distribution is transferred from the first time-bound community (i.e., the time-bound community with the largest number of nodes) to any small time-bound community (i.e., a time-bound community with a relatively smaller number of nodes), the number of nodes in each bucket decreases proportionally. Therefore, an original identification numbers obtained based on the index of in-degree distribution may be scaled with a size ratio between the large time-bound community and the small time-bound community, thereby determining a corresponding identification number in the small time-bound community. As shown in FIG. 12, in a small time-bound community that includes 80 nodes, if the original identification number obtained from the index of in-degree distribution is 86, a product of is calculated with the established index of the in-degree distribution $\pi_i$ to obtain an original identification number v. If the time-bound community is the time-bound community with the largest number of nodes, a node corresponding to the original identification number (ID) is selected as the target node. If the time-bound community is not the time-bound community with the largest number of nodes, the original identification number is mapped by a calculation of $$MapID\left( \left\lfloor \frac{n_v}{N_1(1.0)} v \right\rfloor, V_i \right),$$

where $N_1(1.0)$ represents a value of the index $N_1(y)$ of the in-degree distribution $\pi_i$ when y=1.0; and $V_I$ represents the set of candidate nodes. A node in the set of candidate nodes $V_I$ indicated by the mapped identification number is the target node.

Step 904: A timestamp corresponding to the first target node is generated within the time window of the first time-bound community based on the index of timestamp distribution.

By way of example, the index of timestamp distribution may be established for a time-bound community with the longest time window among a plurality of time-bound communities. Therefore, if the first time-bound community is the time-bound community with the longest time window among the plurality of time-bound communities, the index of timestamp distribution needs to be established for the first time-bound community; and if the first time-bound community is not the time-bound community with the longest time window among the plurality of time-bound communities, the index of timestamp distribution established for the time-bound community with the longest time window among the plurality of time-bound communities may be directly reused.

$$\left\lfloor \frac{80}{100} \cdot 86 \right\rfloor$$

of the size ratio and the original identification number is calculated to obtain a desired identification number 68. That is, the 68th node in the small time-bound community serves as a target node.

Figure 13:
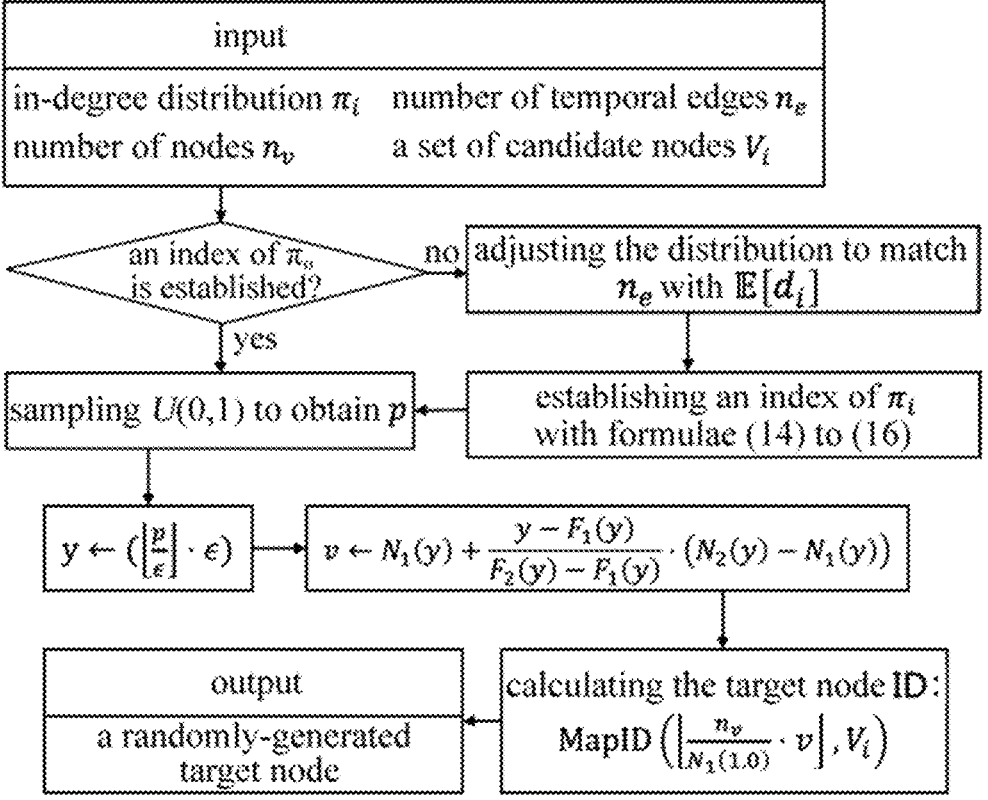
FIG. 13 shows a flowchart of a method for generating a target node according to an embodiment of the present disclosure.

By way of example, FIG. 13 shows a flowchart of a method for generating a target node according to an embodiment of the present disclosure. As shown in FIG. 13, an in-degree distribution $\pi_i$, a number of nodes $n_v$ in a time-bound community, a number of temporal edges $n_e$ in the time-bound community, and a set of candidate nodes $V_i$ (i.e., nodes in the time-bound community) specified by the user are obtained. When selecting a target node for a given source node in the time-bound community, it is first determined whether an index of in-degree distribution is established. If no index of in-degree distribution is established, the distribution may be adjusted to match the number of temporal edges $n_e$ and an expectation of in-degree $\mathbb{E}[d_I]$ of the time-bound community. Then, an index of the in-degree distribution $\pi_i$ is established through formulae (10) to (12). If an index of the in-degree distribution $\pi_i$ has been established, a uniform distribution U(0,1) is sampled for a probability The following is an exemplary description of the process of establishing the index of timestamp distribution for the first time-bound community when the first time-bound community is the time-bound community with the longest time window among the plurality of time-bound communities.

The timestamp distribution may reflect a specific pattern of the interactions between the source node and the target node changing over time. If the timestamp distribution Tut is known, the index of timestamp distribution may be established by taking reference to the generation method of the index of out-degree distribution as described in step 902. For example, the index of the timestamp distribution It may be established through the above formulae (5) to (7), which will not be elaborated here.

Figure 14:
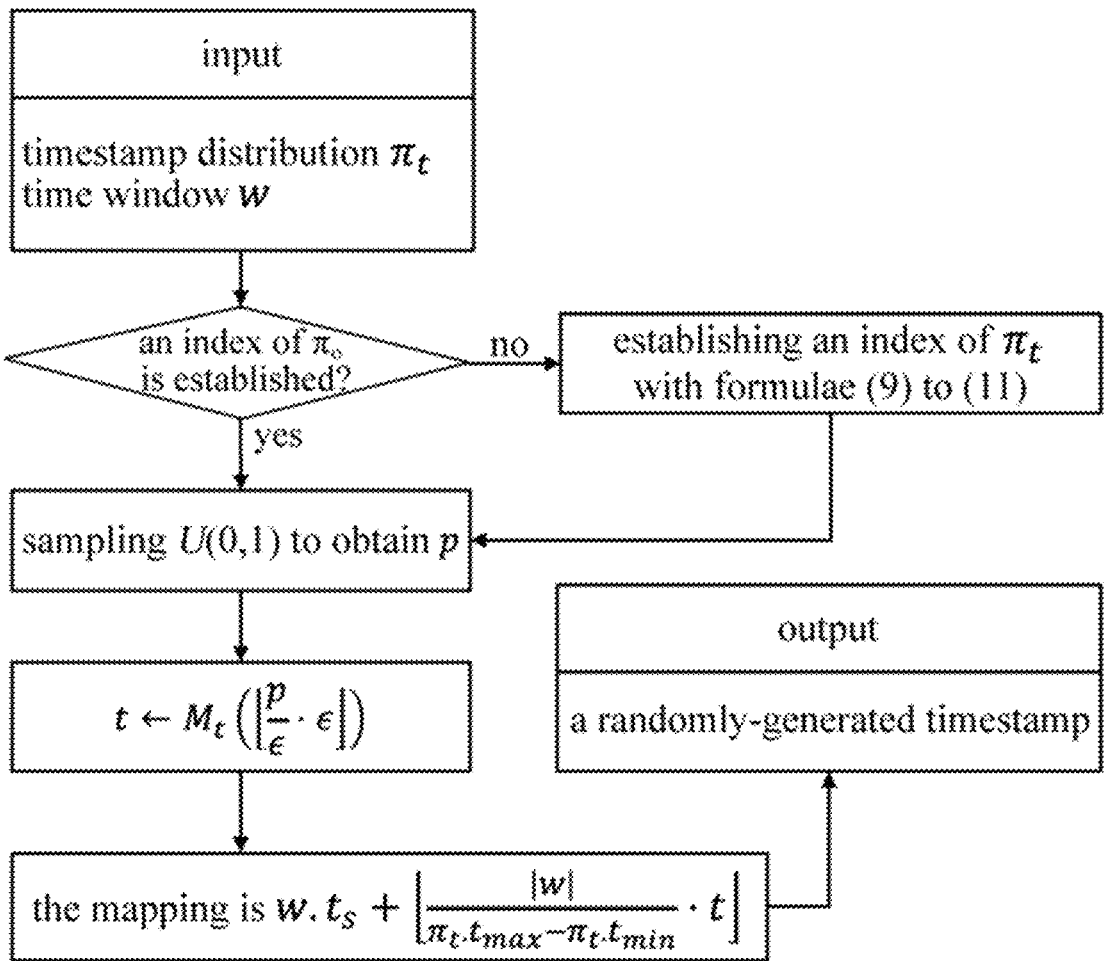
FIG. 14 shows a flowchart of a method for generating a timestamp according to an embodiment of the present disclosure.

By way of example, FIG. 14 shows a flowchart of a method for generating a timestamp according to an embodiment of the present disclosure. As shown in FIG. 14, a timestamp distribution $\pi_t$ specified by the user and a time window $w=[t_s,\ t_s+|w_i|]$ of a time-bound community are obtained; first, it is determined whether an index of timestamp distribution is established, and if it is not established, an index of the timestamp distribution $\pi_t$ may be established through the above formulae (5) to (7); and if an index of the timestamp distribution $\pi_t$ has been established, a uniform distribution U(0,1) is sampled for a probability p, and $$\left\lfloor \frac{p}{\in} \right\rfloor.$$

$\in$ is calculated; the timestamp distribution $\pi_t$ is sampled based on the established index of the timestamp distribution $\pi_t$ for an intermediate value t, which is then linearly mapped into the time window w by $$w \cdot t_s + \left\lfloor \frac{|w|}{\pi_t \cdot t_{max} - \pi_t \cdot t_{min}} \cdot t \right\rfloor$$

for a randomly generated timestamp, where $w.t_s$ represents a starting time $t_s$ of the time window w; and $\pi t.t_{max}$ and $\pi t. t_{min}$ respectively represent an upper boundary $t_{max}$ and a lower boundary $t_{min}$ of a time window of a time-bound community with a longest active time (i.e., a time-bound community with the longest time window). By this, the index of time-stamp distribution is transferred from a time-bound community with a long active time to a time-bound community with a short active time, and the activity intensities of these time-bound communities tend to have a similar trend of variation.

Step 905: A temporal edge within the first time-bound community associated with the first source node is generated based on the first source node, the first target node, and the timestamp corresponding to the first target node.

By way of example, the first source node, any first target node, and the timestamp corresponding to the first target node may form a temporal edge. For any time-bound community, by traversing all the source nodes, the temporal edges within the time-bound community may be generated.

Through the above steps 901 to 905, the temporal edges within each of the plurality of time-bound communities may be generated based on the nodes included in the respective time-bound community, the time windows of the respective time-bound communities, and the index structure.

By way of another example, temporal edges between time-bound communities may be further generated. Due to the closeness requirement, the temporal edges between time-bound communities are typically sparser compared with the temporal edges within a time-bound community. Thus, a between-out-degree $$d_o^b$$

of a node, which is the number of temporal edges that take the node as the source node and do not belong to any time-bound community, may be defined; and the between-out-degree of the node directly determines the number of temporal edges between time-bound communities.

FIG. 15 shows a flowchart of a method for generating temporal edges between different time-bound communities according to an embodiment of the present disclosure. As shown in FIG. 15, the method may include the following steps:

Step 1501: A between-out-degree of the first source node is determined, wherein the between-out-degree represents the number of edges that is associated with the node and do not belong to any time-bound community.

By way of example, the step 1501 may be performed after the above step 905 in FIG. 9.

In one possible implementation, the number of temporal edges between different time-bound communities of the plurality of time-bound communities is determined by a preset messing parameter, wherein the messing parameter represents a degree of clarity of the boundary between the different time-bound communities. In the process of determining the between-out-degree of the first source node, the between-out-degree may be adjusted by the messing parameter, so as to adjust the number of temporal edges between the different time-bound communities.

A probability mass function $$f_o^b(x)$$

below is designed for a between-out-degree of $\alpha$ node:

$$f_o^b(x) = \begin{cases} 1-\delta, & x=0 \\ \delta\alpha e^{-\frac{x}{c+\delta}}, & x \in \{1, \ldots, (d_o^b)_{max}\}, \\ 0, & \text{otherwise} \end{cases} \quad (13)$$

where a constant $$c \geq 1; (d_o^b)_{max}$$

is a messing is the maximum value of $$d_o^b;$$

$\delta \in [0,1]$ is a messing parameter for the time-bound communities; and $\alpha$ satisfies $$\alpha \int_1^{(d_o^b)_{max}} e^{-\frac{x}{c+\delta}} dx = 1.$$

This distribution design has multiple advantages. Firstly, under this distribution, the time-bound communities tend to be close to one another. As the between-out-degree increases, the probability decreases exponentially, ensuring that the probability of a node having a high degree is extremely low. Secondly, this distribution can control the number of temporal edges between time-bound communities, that is, it controls an expectation of the distribution $$\mathbb{E}(d_o^b): \ \mathbb{E}(d_o^b) = 0 \cdot (1-\delta) + \int_1^{d_o^b} x \cdot \delta\alpha e^{-\frac{x}{c+\delta}} dx = (c+\delta)\delta\alpha \left[ (c+\delta+ \right. \quad (14)$$

$$\left. 1)e^{-\frac{1}{c+\delta}} - (c+\delta+(d_o^b)_{max})e^{-\frac{(d_o^b)_{max}}{c+\delta}} \right],$$

-continued where $\mathbb{E}(d_o^b)$ increases with respect to $\delta$, and $$\mathbb{E}[d_o^b] = 0$$

if and only if $\delta=0.0$ Thirdly, this distribution facilitates random sampling. For the first source node, a uniform distribution $U(0,1)$ may be sampled for a probability value p. If $$p \le 1 - \delta, d_o^b = 0;$$

otherwise, if $p>1-\delta$, there is a relationship as shown in formula (15) below:

$$\alpha \int_1^{d_o^b} \delta e^{-\frac{x}{c+\delta}} dx = p - 1 + \delta, \tag{15}$$

and the between-out-degree $$d_o^b$$

may be obtained as:

$$d_o^b = -(c+\delta) \cdot \ln\left(\frac{1-p}{\delta} e^{-\frac{1}{c+\delta}} + \frac{p-1+\delta}{\delta} e^{-\frac{(d_o^b)_{max}}{c+\delta}}\right). \tag{16}$$

Step 1502: A second target node corresponding to the first source node is selected from the nodes included in the plurality of time-bound communities based on the index of in-degree distribution, wherein the number of the second target nodes is the same as the between-out-degree of the first source node, and the first source node and the second target node belong to different time-bound communities.

Please refer to the above descriptions related to step 903 in FIG. 9 for possible implementations of step 1502.

By way of example, the index of in-degree distribution may be established through the above formulae (10) to (12). Please refer to the approach for selecting the first target node corresponding to the first source node in step 903 for the approach for selecting the second target node corresponding to the first source node, which will not be repeated here. It should be noted that unlike the selection of the first target node, the second target node should be selected from the nodes included in the plurality of time-bound communities.

Step 1503: Based on the index of the timestamp distribution, a timestamp corresponding to the second target node is generated from a complementary set of a common portion of the time window of the first time-bound community and the time window of the time-bound community where the second target node is located.

Please refer to the above descriptions related to step 904 in FIG. 9 for the possible implementations in step 1503.

By way of example, the index of timestamp distribution may be established through the above formulae (5) to (7).

Please refer to the approach for generating the timestamp corresponding to the first target node in step 904 for the approach for generating the timestamp corresponding to the second target node, which will not be repeated here. It should be noted that unlike the generation of the timestamp corresponding to the first target node, the timestamp corresponding to the second target node should be generated from a complementary set of a common portion of the time window of the time-bound community where the first source node is located and the time window of the time-bound community where the second target node is located.

Step 1504: A temporal edge between different time-bound communities associated with the first source node is generated based on the first source node, the second target node, and the timestamp corresponding to the second target node.

Through the above steps 1501 to 1504, a temporal edge between different time-bound communities of the plurality of time-bound communities is generated based on the nodes included in the respective time-bound communities, the time windows of the respective time-bound communities, and the index structure.

Figure 16:
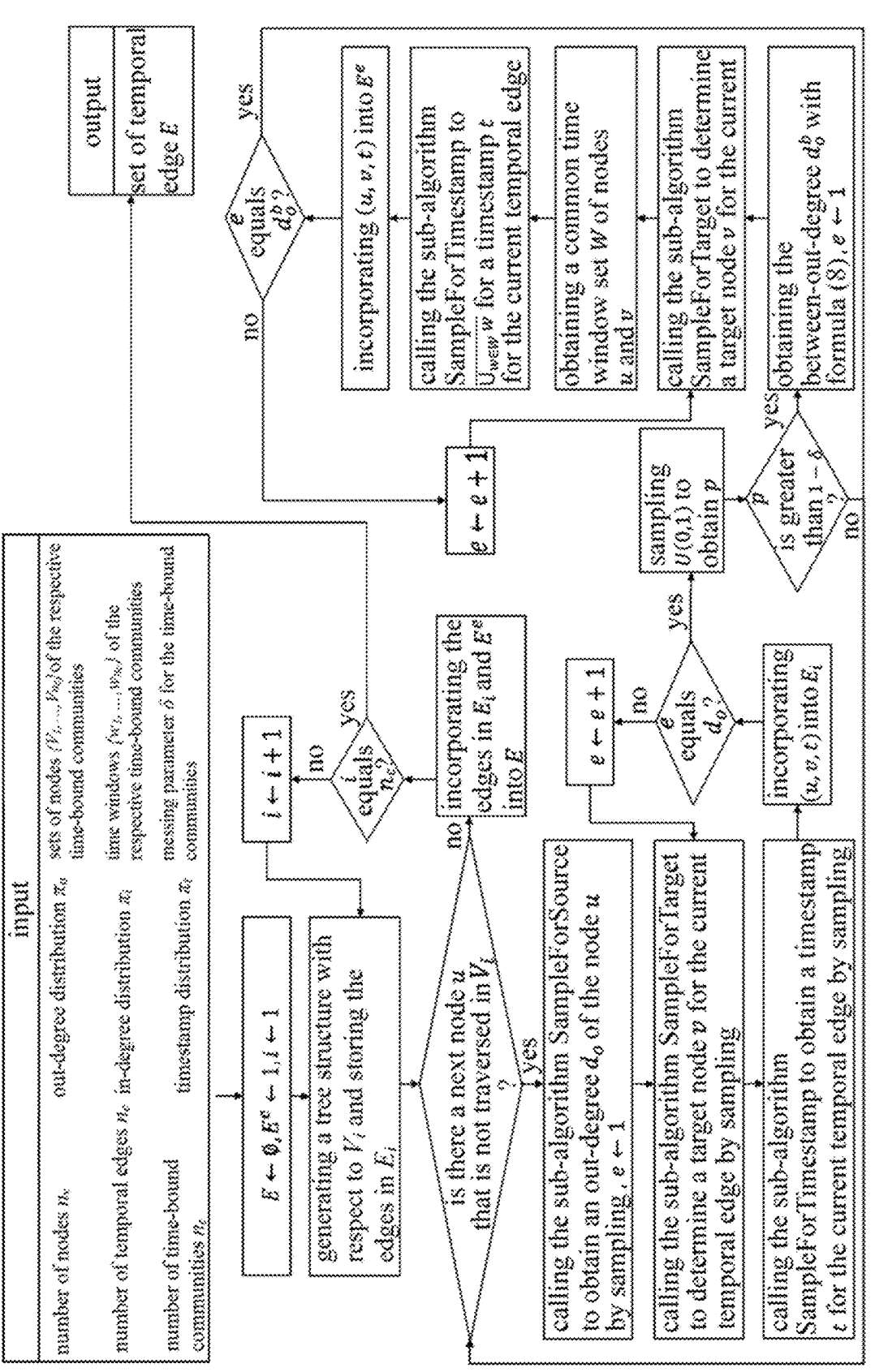
FIG. 16 shows a flowchart of a method for generating a temporal edge according to an embodiment of the present disclosure.

Through the processes shown in FIG. 9 and FIG. 16, the temporal edges within each of the plurality of time-bound communities and the temporal edges between different time-bound communities of the plurality of time-bound communities may be generated, thus completing the temporal edge linking phase.

By way of example, FIG. 16 shows a flowchart of a method for generating a temporal edge according to an embodiment of the present disclosure. As shown in FIG. 16, a number of nodes $n_v$, a number of temporal edges $n_e$, a number of time-bound communities $n_c$, an out-degree distribution $\pi_o$, an in-degree distribution $\pi_I$, a timestamp distribution $\pi_t$, sets of nodes $\{v_1, \ldots, V_{n_c}\}$ of the respective time-bound communities, time windows $\{W_1, \ldots, W_{n_c}\}$ of the respective time-bound communities, and a messing parameter $\delta$ for time-bound communities are obtained. For the i-th time-bound community, a tree structure with respect to the nodes $V_i$ in the time-bound community is generated to ensure connectivity. For each source node u in the i-th time-bound community, temporal edges within the i-th time-bound community associated with u are generated first. Specifically, the sub-algorithm SampleForSource is called to perform the above step 902 so that an out-degree $d_o$ of the source node u is obtained through sampling; the sub-algorithm SampleForTarget is called to perform the above step 903 so that the set of nodes $V_i$ is sampled for a target node v of the current temporal edge; and the sub-algorithm SampleForTimestamp is called to perform the above step 904 so that the time window $W_i$ is sampled for a timestamp t of the current temporal edge, thus generating a temporal edge (u, v, t). Next, temporal edges between different time-bound communities associated with the source node are generated, with the target node v being selected from all possible nodes, and the timestamp being selected from a complementary set of $\alpha$ common time. window of the source node u and the target node v. Specifically, a between-out-degree $$d_o^b$$

of the source node u is obtained with the above formula (16); the sub-algorithm SampleForTarget is called to perform the above step 1502 so that a target node v' of the current temporal edge is obtained through sampling; and the sub-algorithm SampleForTimestamp is called to perform the above step 1503 to obtain a common time window set W of the time-bound communities where the source node u and the target node v' are respectively located, and a complementary set $\overline{U_{w \in W}}^{W}$ of the intersection W is sampled for a timestamp t' of the current temporal edge, thus generating a temporal edge (u, v', t'). Eventually, a set of temporal edges E within each time-bound community and between different time-bound communities may be obtained. By this, the temporal edges within each time-bound community and between different time-bound communities are generated, wherein the temporal edges within each time-bound community satisfy the constraints of given out-degree distribution, in-degree distribution, and timestamp distribution, while the number of temporal edges between time-bound communities is regulated by the messing parameter for the time-bound communities.

Taking an academic discussion scenario as an example, a temporal graph for the academic discussion scenario is generated by using the method for generating a temporal graph with time-bound communities from the above embodiment. First, a number of nodes $n_v$, a number of temporal edges $n_f$, a number of time-bound communities $n_c$, an out-degree distribution $\pi_o$, an in-degree distribution $\pi_f$, a timestamp distribution $\pi_t$, a parameter $\lambda$ for a power-law distribution of community sizes (the value of $\lambda$ is the opposite number of the value of the exponent of the power-law distribution), a number of overlapping relationships between time-bound communitiesm, a time-bound community overlapping parameter $\Omega$, a messing parameter $\delta$ for time-bound communities, and the like specified by the user are obtained. For example, the user may specify ten thousand participants in the discussion (i.e., the number of nodes $n_v$ is 10,000), one hundred discussion communities (i.e., the number of time-bound communities $n_c$ is 100), and one hundred thousand temporal edges (i.e., the number of temporal edges $n_f$ is 100,000); the out-degree distribution $\pi_f$, and the in-degree distribution $\pi_I$ both follow a power-law distribution (with an exponent of −1.15); the timestamp distribution $\pi_t$ follows a normal distribution (such as a normal distribution within a range of 0 to 1,000); the parameter of the power-law distribution that the community sizes follow is 1.5; there are 50 pairs of time-bound communities overlapping each other with a degree of 0.3 (i.e., the number of overlapping relationships between the time-bound communities m is 50, and the time-bound community overlapping parameter $\Omega$ is 0.3); the degree of mess for the time-bound communities is 0.1 (i.e., the messing parameter $\delta$ for the time-bound communities is 0.1); and the values of other parameters may be set to default. First, in the node grouping phase, the nodes are grouped into the respective time-bound communities, ensuring that the community sizes follow a power-law distribution influenced by parameters specified by the user commonly. For example, the node grouping may be based on the number of time-bound communities $n_c$, the parameter $\lambda$ of the power-law distribution, and m randomly-generated overlapping relationships, resulting in sets of nodes of the $n_c$ time-bound communities. Then, in the time window binding phase, an active time window is generated for each time-bound community. Then in the temporal edge linking phase, temporal edges are generated using a temporal edge distribution model. Finally, a temporal graph G of the academic discussion containing 10,000 nodes and 100 time-bound communities is obtained. The temporal edge distribution model is a framework model that simulates a user-specified distribution and efficiently generates temporal edges with an index structure. With the design of its index structure, generating one temporal edge only requires a constant time. Meanwhile, since the index structure of the temporal edge distribution model has transferability between different time-bound communities, the index structure is established only for the time-bound community with the largest number of nodes and for the time-bound community with the longest time window. This enables an efficient generation of $\alpha$ large number of temporal edges within and between the time-bound communities under the constraints of the given distributions. In the field of community detection in temporal graph, collecting sufficient real data is very challenging, so in real temporal graph data sets used by some existing community detection techniques the number of temporal edges is often limited to the order of tens of millions. Due to the shortcomings of existing temporal graph generation methods, synthetic temporal graph data sets used by some existing community detection techniques are also limited to a scale of thousands of nodes and hundreds of snapshots (i.e., the projection of the temporal graph at a certain timestamp). While with the method for generating a temporal graph with time-bound communities provided in the embodiment of the present disclosure, it is possible to generate nodes and temporal edges of a hundred-million scale or beyond, thus meeting the requirements of large-scale data for techniques of community detection in temporal graphs.

Based on the same inventive concept of the above method embodiments, an embodiment of the present disclosure further provides a device for generating a temporal graph with time-bound communities. The device for generating a temporal graph with time-bound communities may be used to implement the technical solutions described in the above embodiments of the method for generating a temporal graph with time-bound communities.

Figure 17:
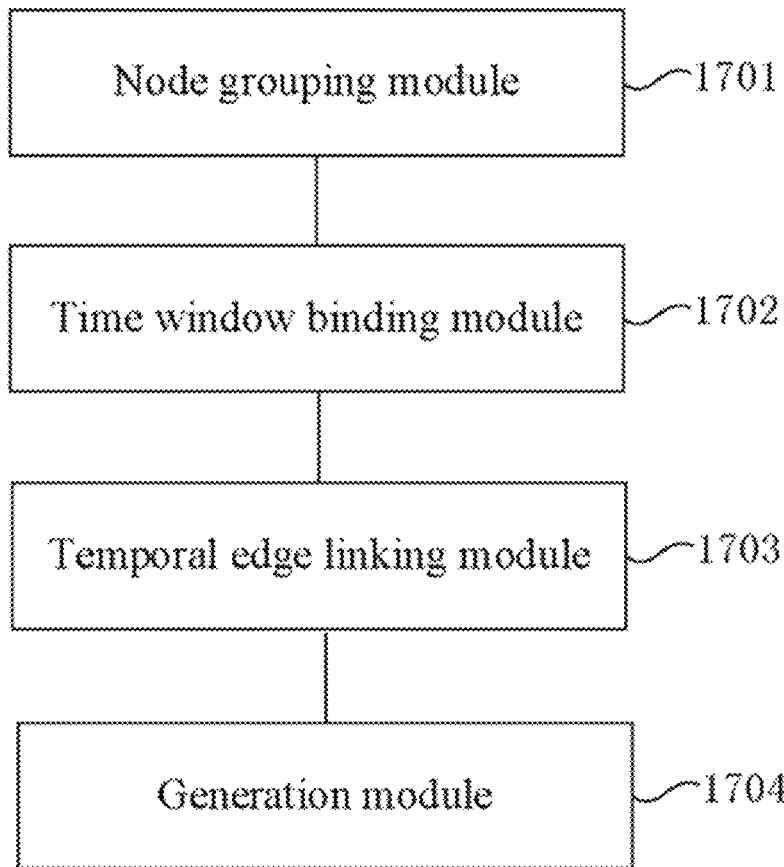
FIG. 17 shows a structural diagram of a device for generating a temporal graph with time-bound communities according to an embodiment of the present disclosure.

FIG. 17 shows a structural diagram of a device for generating a temporal graph with time-bound communities according to an embodiment of the present disclosure. As shown in FIG. 17, the device comprises:

a node grouping module 1701 configured to group a set of nodes in a target scenario to obtain nodes included in each of a plurality of time-bound communities, wherein the time-bound community represents a community that is in active status for a period of time and eventually goes extinct; and the numbers of nodes included in the plurality of time-bound communities follow a power-law distribution;

a time window binding module 1702 configured to generate a time window for each of the plurality of time-bound communities, wherein starting times of the time windows corresponding to the plurality of time-bound communities follow a uniform distribution, and lengths of the time windows corresponding to the plurality of time-bound communities follow a power-law distribution;

a temporal edge connection module 1703 configured to construct an index structure that is transferable between different time-bound communities, and generate temporal edges within each of the plurality of time-bound communities and/or temporal edges between different time-bound communities of the plurality of time-bound communities based on the nodes included in the respective time-bound communities, the time windows of the respective time-bound communities, and the index structure; and a generation module 1704 configured to generate a temporal graph of the target scenario, based on the nodes included in each of the plurality of time-bound communities, the time window of each of the plurality of time-bound communities, and the temporal edges within each of the plurality of time-bound communities and/or the temporal edges between different time-bound communities of the plurality of time-bound communities.

According to an embodiment of the present disclosure, a set of nodes in a target scenario is grouped to obtain nodes included in each of α plurality of time-bound communities; the numbers of nodes included in the plurality of time-bound communities follow a power-law distribution; a time window is generated for each of the plurality of time-bound communities, wherein starting times of the time windows corresponding to the plurality of time-bound communities follow a uniform distribution, and lengths of the time windows corresponding to the plurality of time-bound communities follow a power-law distribution; an index structure that is transferable between different time-bound communities is constructed, and temporal edges within each of the plurality of time-bound communities and/or temporal edges between different time-bound communities of the plurality of time-bound communities are generated based on the nodes included in the respective time-bound communities, the time windows of the respective time-bound communities, and the index structure; and a temporal graph of the target scenario is generated based on the nodes included in each of the plurality of time-bound communities, the time window of each of the plurality of time-bound communities, and the temporal edges within each of the plurality of time-bound communities and/or the temporal edges between different time-bound communities of the plurality of time-bound communities. By this, through the three phases of node grouping, time window binding, and temporal edge linking, a temporal graph with time-bound communities is generated, wherein the number of nodes included in the time-bound communities, the starting times of the time windows of the time-bound communities, the lengths of the time windows of the time-bound communities, and the like all follow specific distributions, which may reflect the real situation of network distribution. By way of example, a user may specify parameters for a specific distribution. It is also possible to quickly generate temporal edges based on the index structure transferable between different time-bound communities, thereby generating a temporal graph that contains time-bound communities and meets the user requirements in a flexible and efficient manner.

In one possible implementation, the temporal edge linking module is further configured to: select a time-bound community with a largest number of nodes from the plurality of time-bound communities, and establish an index of out-degree distribution and an index of in-degree distribution for the time-bound community with the largest number of nodes; and select a time-bound community with a longest time window from the plurality of time-bound communities, and establish an index of timestamp distribution for the time-bound community with the longest time window.

In one possible implementation, the temporal edge linking module is further configured to: generate a tree structure with respect to nodes included in a first time-bound community, wherein the first time-bound community is any of the plurality of time-bound communities; determine an out-degree of a first source node based on the index of out-degree distribution, wherein the first source node is any source node in the tree structure; select a first target node corresponding to the first source node from the nodes included in the first time-bound community based on the index of in-degree distribution, wherein the number of the first target nodes is the same as the out-degree of the first source node; generate a timestamp corresponding to the first target node from a time window of the first time-bound community based on the index of timestamp distribution; and generate a temporal edge within the first time-bound community associated with the first source node based on the first source node, the first target node, and the timestamp corresponding to the first target node.

In one possible implementation, the temporal edge linking module is further configured to: determine a between-out-degree of the first source node, wherein the between-out-degree represents the number of edges associated with the node that do not belong to any of the time-bound communities; select a second target node corresponding to the first source node from the nodes included in the plurality of time-bound communities based on the index of in-degree distribution, wherein the number of the second target nodes is the same as the between-out-degree of the first source node, and the first source node and the second target node belong to different time-bound communities; generate, based on the index of timestamp distribution, a timestamp corresponding to the second target node from a complementary set of α common portion of a time window of a time-bound community where the first source node is located and a time window of a time-bound community where the second target node is located; and generate a temporal edge between different time-bound communities associated with the first source node based on the first source node, the second target node, and the timestamp corresponding to the second target node.

In one possible implementation, the number of temporal edges between different time-bound communities of the plurality of time-bound communities is determined by a preset messing parameter, wherein the messing parameter represents a degree of clarity of the boundary between the different time-bound communities.

In one possible implementation, the time window binding module is further configured to: determine an expectation of the length of the time window of the first time-bound community based on the number of nodes included in the first time-bound community; determine a probability density function of the length of the time window of the first time-bound community based on the expectation of the length of the time window of the first time-bound community; sample the probability density function of the length of the time window of the first time-bound community to obtain a length of a target time window of the first time-bound community; obtain a starting time of the target time window of the first time-bound community by sampling based on the length of the target time window of the first time-bound community and a preset time range; and determine the target time window of the first time-bound community based on the starting time of the target time window of the first time-bound community and the length of the target time window of the first time-bound community.

In one possible implementation, the time window binding module is further configured to: calculate an average value of the length of the time window of the first time-bound community based on the number of nodes included in the first time-bound community, wherein a logarithmic correlation exists between the average value of the length of the time window of the first time-bound community and the number of nodes included in the first time-bound community; and determine the average value of the length of the time window of the first time-bound community as the expectation of the length of the time window of the first time-bound community.

In one possible implementation, the plurality of time-bound communities includes a preset number of overlapping structures, wherein each of the overlapping structures includes a shared node present in two time-bound communities; and a degree of the shared node exceeds the degrees of other nodes in either of the two time-bound communities, and a ratio of the number of the shared nodes to the number of the nodes in either of the two time-bound communities is a preset value.

In some embodiments, the functions of or the modules included in the devices provided by the embodiments of the present disclosure may be used to carry out the methods described in the above method embodiments, the specific implementation of which may refer to the description of the above method embodiments and will not be repeated herein for the sake of brevity.

An embodiment of the present disclosure further provides a computer readable storage medium storing computer program instructions, which, when executed by a processor, implements the above method for generating a temporal graph with time-bound communities. The computer readable storage medium may be a transitory or non-transitory computer readable storage medium.

An embodiment of the present disclosure further provides an electronic apparatus, comprising: a processor; and a memory for storing processor executable instructions, wherein the processor is configured to, when executing the instructions stored in the memory, implement the above method for generating a temporal graph with time-bound communities.

An embodiment of the present disclosure further provides a computer program product comprising computer readable code or a non-transitory computer readable storage medium carrying computer readable code. When the computer readable code is executed in a processor of an electronic apparatus, the processor of the electronic apparatus implements the above method for generating a temporal graph with time-bound communities.

Figure 18:
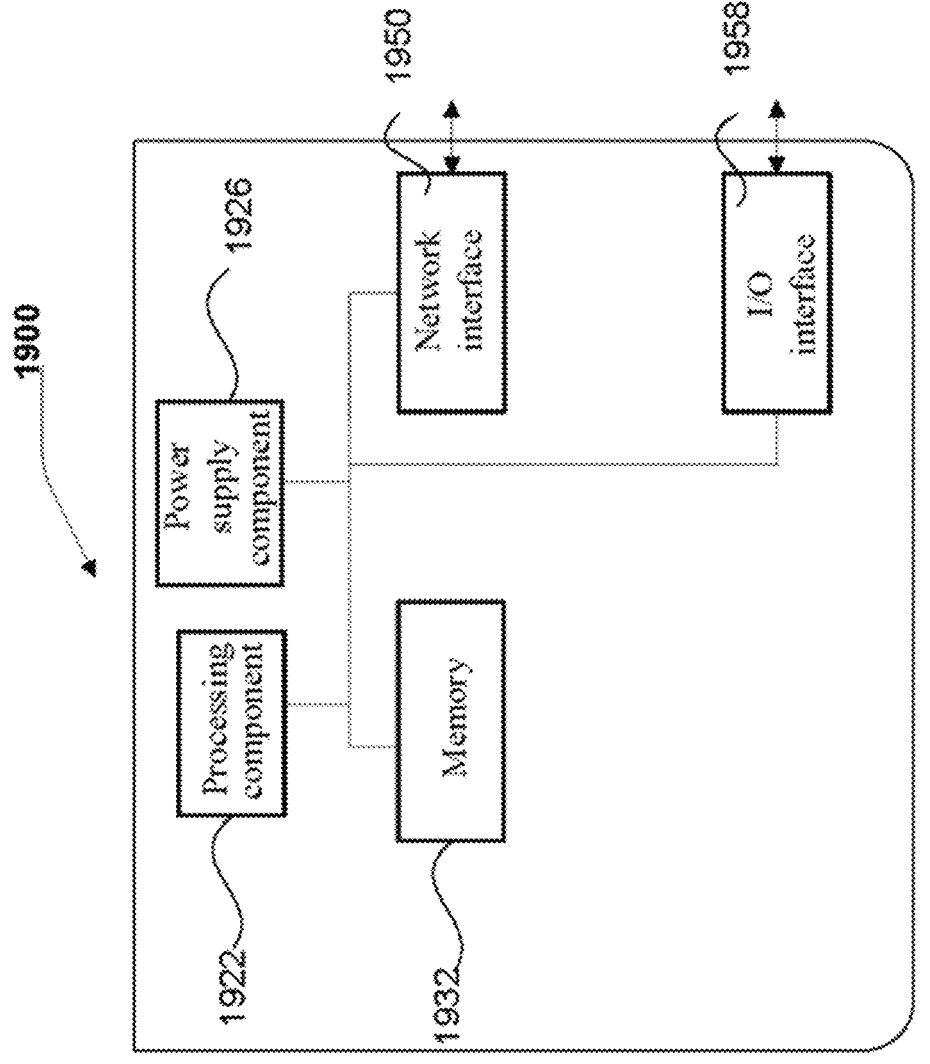
FIG. 18 shows a block diagram of an electronic apparatus 1900 according to an embodiment of the present application.

FIG. 18 shows a block diagram of an electronic apparatus 1900 according to an embodiment of the present application. For example, the apparatus 1900 may be provided as a server or terminal device. Referring to FIG. 18, the apparatus 1900 comprises a processing component 1922 which further comprises one or more processors; and memory resources represented by a memory 1932 for storing instructions, such as application programs, that are executable by the processing component 1922. The application programs stored in the memory 1932 may include one or more modules each corresponding to a set of instructions. In addition, the processing component 1922 is configured to execute instructions to carry out the above method for generating a temporal graph with time-bound communities based on mobile phone signaling data.

The apparatus 1900 may further comprise a power supply component 1926 configured to perform power management for the apparatus 1900, a wired or wireless network interface 1950 configured to connect the apparatus 1900 to a network, and an input/output interface 1958 (I/O interface). The apparatus 1900 may operate an operating system stored in the memory 1932, such as Windows Server™, Mac OS X™, Unix™, Linux™, and FreeBSD™

The present disclosure may be a system, a method, and/or a computer program product. The computer program product may include a computer readable storage medium carrying thereon computer readable program instructions for causing a processor to carry out the aspects of the present disclosure.

The computer readable storage medium can be a tangible device that can retain and store instructions used by an instruction executing device. The computer readable storage medium may be, but not limited to, e.g., electronic storage device, magnetic storage device, optical storage device, electromagnetic storage device, semiconductor storage device, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing devices from a computer readable storage medium or to an external computer or external storage device via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, micro-code, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider). In some embodiments, electronic circuitry, such as programmable logic circuitry, field-programmable gate arrays (FPGA), or programmable logic arrays (PLA), may be customized from status information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (system), and computer program product according to the embodiments of the present disclosure. It will be appreciated that each block in the flowchart and/or the block diagram, and combinations of blocks in the flowchart and/or block diagram, can be implemented by the computer readable program instructions.

These computer readable program instructions may be provided to a processor of α general purpose computer, a dedicated computer, or other programmable data processing devices, to produce a machine, such that the instructions create means for implementing the functions/actions specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other devices to function in a particular manner, such that the computer readable storage medium having instructions stored therein comprises a product that includes instructions implementing aspects of the functions/actions specified in one or more blocks in the flowchart and/or block diagram.

The computer readable program instructions may also be loaded onto a computer, other programmable data processing devices, or other devices to have a series of operational steps executed on the computer, other programmable data processing devices or other devices, to produce a computer implemented process, such that the instructions executed on the computer, other programmable data processing devices or other devices implement the functions/actions specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a part of α module, a program segment, or a portion of code, which comprises one or more executable instructions for implementing the specified logical function(s). In some alternative implementations, the functions denoted in the blocks may occur in an order different from that denoted in the drawings. For example, two successive blocks may, in fact, be executed substantially concurrently, or sometimes they may be executed in an opposite order, depending upon the functions involved. It will also be noted that each block in the block diagram and/or flowchart, and combinations of blocks in the block diagram and/or flowchart, can be implemented by dedicated hardware-based systems performing the specified functions or actions, or by combinations of dedicated hardware and computer instructions.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A method for generating a temporal graph with time-bound communities, comprising:

grouping a set of nodes in a target scenario to obtain nodes included in each of a plurality of time-bound communities, wherein the time-bound community represents a community that is in active status for a period of time and eventually goes extinct; and numbers of nodes included in the plurality of time-bound communities follow a power-law distribution;

generating a time window for each of the plurality of time-bound communities, wherein starting times of the time windows corresponding to the plurality of time-bound communities follow a uniform distribution, and lengths of the time windows corresponding to the plurality of time-bound communities follow a power-law distribution, wherein generating the time window for each of the plurality of time-bound communities comprises:

determining an expectation of a length of a time window of a first time-bound community based on a number of nodes included in the first time-bound community;

determining a probability density function of the length of the time window of the first time-bound community based on the expectation of the length of the time window of the first time-bound community;

obtaining a length of a target time window of the first time-bound community by sampling the probability density function of the length of the time window of the first time-bound community;

obtaining a starting time of the target time window of the first time-bound community by sampling based on the length of the target time window of the first time-bound community and a preset time range; and determining the target time window of the first time-bound community based on the starting time of the target time window of the first time-bound community and the length of the target time window of the first time-bound community;

constructing an index structure that is transferable between different time-bound communities, and generating, based on the nodes included in respective time-bound communities, the time windows of respective time-bound communities, and the index structure, temporal edges within each of the plurality of time-bound communities and/or temporal edges between the different time-bound communities of the plurality of time-bound communities; and generating the temporal graph of the target scenario based on the nodes included in each of the plurality of time-bound communities, the time window of each of the plurality of time-bound communities, and the temporal edges within each of the plurality of time-bound communities and/or the temporal edges between the different time-bound communities of the plurality of time-bound communities.

2. The method according to claim 1, wherein constructing the index structure that is transferable between the different time-bound communities comprises:

selecting a time-bound community containing a largest number of nodes from the plurality of time-bound communities, and establishing an index of out-degree distribution and an index of in-degree distribution for the time-bound community containing the largest number of nodes; and selecting a time-bound community with a longest time window from the plurality of time-bound communities, and establishing an index of timestamp distribution for the time-bound community with the longest time window.

3. The method according to claim 2, wherein generating, based on the nodes included in the respective time-bound communities, the time windows of the respective time-bound communities, and the index structure, the temporal edges within each of the plurality of time-bound communities and/or the temporal edges between the different time-bound communities of the plurality of time-bound communities comprises:

generating a tree structure with respect to nodes included in a second first time-bound community, wherein the second first time-bound community is any of the plurality of time-bound communities;

determining an out-degree of a first source node based on the index of out-degree distribution, wherein the first source node is any source node in the tree structure;

selecting a first target node corresponding to the first source node from the nodes included in the second first time-bound community based on the index of in-degree distribution, wherein a number of the first target nodes is same as the out-degree of the first source node;

generating, based on the index of timestamp distribution, a timestamp corresponding to the first target node from a time window of the second first time-bound community; and generating a temporal edge within the second first time-bound community associated with the first source node based on the first source node, the first target node, and the timestamp corresponding to the first target node.

4. The method according to claim 3, wherein generating, based on the nodes included in the respective time-bound communities, the time windows of the respective time-bound communities, and the index structure, the temporal edges within each of the plurality of time-bound communities and/or the temporal edges between the different time-bound communities of the plurality of time-bound communities further comprises:

determining a between-out-degree of the first source node, wherein the between-out-degree represents a number of edges associated with the node that do not belong to any of the time-bound communities;

selecting a second target node corresponding to the first source node from the nodes included in the plurality of time-bound communities based on the index of in-degree distribution, wherein a number of second target nodes is the same as the between-out-degree of the first source node, and the first source node and the second target node belong to different time-bound communities;

generating, based on the index of timestamp distribution, a timestamp corresponding to the second target node from a complementary set of a common portion of a time window of a time-bound community where the first source node is located and a time window of a time-bound community where the second target node is located; and generating a temporal edge between the different time-bound communities associated with the first source node based on the first source node, the second target node, and the timestamp corresponding to the second target node.

5. The method according to claim 4, wherein a number of the temporal edges between the different time-bound communities of the plurality of time-bound communities is determined by a preset messing parameter, wherein the messing parameter represents a degree of clarity of a boundary between the different time-bound communities.

6. The method according to claim 1, wherein determining the expectation of the length of the time window of the first time-bound community based on the number of the nodes included in the first time-bound community comprises:

calculating an average value of the length of the time window of the first time-bound community based on the number of the nodes included in the first time-bound community, wherein a logarithmic correlation exists between the average value of the length of the time window of the first time-bound community and the number of the nodes included in the first time-bound community; and determining the average value of the length of the time window of the first time-bound community as the expectation of the length of the time window of the first time-bound community.

7. The method according to claim 1, wherein the plurality of time-bound communities comprise a preset number of overlapping structures, wherein each of the overlapping structures comprises a shared node present in two time-bound communities; and a degree of the shared node exceeds degrees of other nodes in either of the two time-bound communities, and a ratio of a number of shared nodes to a number of nodes in either of the two time-bound communities is a preset value.

8. One or more non-transitory computer readable storage medium storing computer program instructions, which, when executed by a processor, cause the processor to:

group a set of nodes in a target scenario to obtain nodes included in each of a plurality of time-bound communities, wherein the time-bound community represents a community that is in active status for a period of time and eventually goes extinct; and numbers of nodes included in the plurality of time-bound communities follow a power-law distribution;

generate a time window for each of the plurality of time-bound communities, wherein starting times of the time windows corresponding to the plurality of time-bound communities follow a uniform distribution, and lengths of the time windows corresponding to the plurality of time-bound communities follow a power-law distribution, wherein the processor being configured to generate the time window for each of the plurality of time-bound communities comprises the processor being configured to:

determine an expectation of a length of a time window of a first time-bound community based on a number of nodes included in the first time-bound community;

determine a probability density function of the length of the time window of the first time-bound community based on the expectation of the length of the time window of the first time-bound community;

obtain a length of a target time window of the first time-bound community by sampling the probability density function of the length of the time window of the first time-bound community;

obtain a starting time of the target time window of the first time-bound community by sampling based on the length of the target time window of the first time-bound community and a preset time range; and determine the target time window of the first time-bound community based on the starting time of the target time window of the first time-bound community and the length of the target time window of the first time-bound community;

construct an index structure that is transferable between different time-bound communities, and generate, based on the nodes included in respective time-bound communities, the time windows of respective time-bound communities, and the index structure, temporal edges within each of the plurality of time-bound communities and/or temporal edges between the different time-bound communities of the plurality of time-bound communities; and generate a temporal graph of the target scenario based on the nodes included in each of the plurality of time-bound communities, the time window of each of the plurality of time-bound communities, and the temporal edges within each of the plurality of time-bound communities and/or the temporal edges between the different time-bound communities of the plurality of time-bound communities.

9. An electronic apparatus, comprising: a processor; and a memory for storing processor executable instructions, wherein the processor is configured to:

group a set of nodes in a target scenario to obtain nodes included in each of a plurality of time-bound communities, wherein the time-bound community represents a community that is in active status for a period of time and eventually goes extinct; and numbers of nodes included in the plurality of time-bound communities follow a power-law distribution; generate a time window for each of the plurality of time-bound communities, wherein starting times of the time windows corresponding to the plurality of time-bound communities follow a uniform distribution, and lengths of the time windows corresponding to the plurality of time-bound communities follow a power-law distribution, wherein the processor being configured to generate the time window for each of the plurality of time-bound communities comprises the processor being configured to:

determine an expectation of a length of a time window of a first time-bound community based on a number of nodes included in the first time-bound community;

determine a probability density function of the length of the time window of the first time-bound community based on the expectation of the length of the time window of the first time-bound community;

obtain a length of a target time window of the first time-bound community by sampling the probability density function of the length of the time window of the first time-bound community;

obtain a starting time of the target time window of the first time-bound community by sampling based on the length of the target time window of the first time-bound community and a preset time range; and determine the target time window of the first time-bound community based on the starting time of the target time window of the first time-bound community and the length of the target time window of the first time-bound community;

construct an index structure that is transferable between different time-bound communities, and generate, based on the nodes included in respective time-bound communities, the time windows of respective time-bound communities, and the index structure, temporal edges within each of the plurality of time-bound communities and/or temporal edges between the different time-bound communities of the plurality of time-bound communities; and generate the temporal graph of the target scenario based on the nodes included in each of the plurality of time-bound communities, the time window of each of the plurality of time-bound communities, and the temporal edges within each of the plurality of time-bound communities and/or the temporal edges between the different time-bound communities of the plurality of time-bound communities.

* * * * *